(12) United States Patent
Takenaka et al.

(10) Patent No.: US 9,366,407 B2
(45) Date of Patent: Jun. 14, 2016

(54) LIGHTING DEVICE FOR VEHICLE

(75) Inventors: Nobuyuki Takenaka, Iruma (JP); Daisuke Kuriki, Hamura (JP); Hajime Soda, Asaka (JP); Takashi Tetsuka, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 14/006,505

(22) PCT Filed: Mar. 9, 2012

(86) PCT No.: PCT/JP2012/056057
§ 371 (c)(1),
(2), (4) Date: Sep. 20, 2013

(87) PCT Pub. No.: WO2012/132831
PCT Pub. Date: Oct. 4, 2012

(65) Prior Publication Data
US 2014/0016336 A1    Jan. 16, 2014

(30) Foreign Application Priority Data
Mar. 31, 2011    (JP) ................. 2011-081234

(51) Int. Cl.
| | |
|---|---|
| *B62J 6/00* | (2006.01) |
| *F21S 8/10* | (2006.01) |
| *B60Q 1/00* | (2006.01) |
| *B60Q 1/38* | (2006.01) |

(52) U.S. Cl.
CPC ............... *F21S 48/25* (2013.01); *B60Q 1/0088* (2013.01); *B60Q 1/38* (2013.01); *B62J 6/005* (2013.01); *F21S 48/215* (2013.01); *F21S 48/22* (2013.01); *F21S 48/2206* (2013.01); *F21S 48/236* (2013.01)

(58) Field of Classification Search
CPC ................ B62J 6/00; B62J 6/04; B62J 6/005; B62J 6/003; B62J 6/16; B62J 11/00; B62J 15/00; F21L 15/14; F21S 48/2206; F21V 21/0816; F21V 21/084; F21V 27/02; Y10T 156/10
USPC ......... 362/475, 487, 507, 509, 538, 539, 546, 362/257, 459, 460, 476, 217, 217.01, 227, 362/473
See application file for complete search history.

(56) References Cited

U.S. PATENT DOCUMENTS

| | | | | |
|---|---|---|---|---|
| 4,951,179 | A * | 8/1990 | Machida | ............... B60Q 1/302 362/245 |
| 6,502,975 | B1 * | 1/2003 | Branstetter | ................... 362/549 |
| 6,840,661 | B2 * | 1/2005 | Desjardins | .................... 362/545 |

(Continued)

FOREIGN PATENT DOCUMENTS

JP    4437952 B2    3/2010

*Primary Examiner* — Jason Moon Han
*Assistant Examiner* — Omar Rojas Cadima
(74) *Attorney, Agent, or Firm* — Carrier Blackman & Associates, P.C.; William D. Blackman; Joseph P. Carrier

(57) ABSTRACT

In the present invention, an inner lens of a turn signal lamp is provided with: a lens cut part that inhibits the transmission of light travelling, when seen in a front view, linearly from a substrate toward an outer lens; a projection part that projects toward an LED; and an eave part that extends from the base end side of the projection part inwardly in the vehicle width direction. A harness that is electrically connected with the LED is connected to the substrate through a partial space that is surrounded by the substrate, the projection part, and the eave part.

6 Claims, 12 Drawing Sheets

(56) References Cited

U.S. PATENT DOCUMENTS

| | | | |
|---|---|---|---|
| 7,476,014 B1 * | 1/2009 | McCarthy et al. | 362/519 |
| 2005/0169002 A1 * | 8/2005 | Steen | B60Q 1/302 |
| | | | 362/487 |
| 2005/0265037 A1 * | 12/2005 | Newton | B60Q 1/2665 |
| | | | 362/494 |
| 2006/0028830 A1 * | 2/2006 | Tsai | 362/509 |
| 2006/0077677 A1 | 4/2006 | Yamaguchi et al. | |
| 2007/0183165 A1 * | 8/2007 | Sure et al. | 362/509 |

* cited by examiner

FIG. 4

| SYSTEM STATES | TCS-ON INDICATOR | TCS-OFF INDICATOR |
|---|---|---|
| 2 SECONDS LATER AFTER IGNITION SWITCH IS TURNED ON | (TC) ENERGIZED | (T̸C̸) ENERGIZED |
| UPON INITIAL DIAGNOSIS PROCESS | (TC) ENERGIZED | DE-ENERGIZED |
| IN NORMAL DRIVING MODE | DE-ENERGIZED | DE-ENERGIZED |
| DURING TCS OPERATION | (TC) BLINKING | DE-ENERGIZED |
| WHEN TCS IS TURNED OFF | DE-ENERGIZED | (T̸C̸) ENERGIZED |
| UPON TCS FAILURE | (TC) ENERGIZED | DE-ENERGIZED |

LIGHTING DEVICE FOR VEHICLE

TECHNICAL FIELD

The present invention relates to a vehicular lighting device (lighting device for vehicle) that employs light emitting diodes as a light source.

BACKGROUND ART

Heretofore, with a lighting device that employs light emitting diodes, in order to enhance the external appearance (aesthetic appearance) thereof, a structure has been provided in which wires (harnesses) for supplying power to the light emitting diodes are hidden from view.

For example, in Japanese Patent No. 4437952, a tail lamp structure is disclosed in which light emitting diodes are applied as a light source. As shown in FIG. 8 of Japanese Patent No. 4437952, a light emitting diode board (board) on which light emitting diodes are mounted is attached to a housing (base), and a harness, which is connected to the board, extends from a lower side of the base. In this case, a configuration is provided so that the harness cannot be seen from the exterior, by means of a mud cover that is laid over the harness underneath a lens.

SUMMARY OF INVENTION

However, when a structure is provided as in Japanese Patent No. 4437952, in which a vehicle cover, such as the aforementioned mud cover, is used to cover a harness that extends from the board, the light emitting area of the lighting device is reduced. On the other hand, in the case that the harness is covered by a vehicle cover while attempting to preserve the light emitting area of the lighting device, a structure may be considered in which the board on which the light emitting diodes are mounted is made larger, whereas the harness is connected at a position separated a given distance from the light emitting diodes, and then is covered by the vehicle cover. However, in this case, there is a possibility for other problems to occur in that, due to the fact that the board is made larger in size, production costs increase, and the lighting device is made larger in scale, which contravenes the goal of enhancing the external appearance of the lighting device.

The present invention has been made taking into consideration the aforementioned situation, and has the object of providing a vehicular lighting device, which is capable of enhancing the external appearance of the lighting device by concealing the visibility of a harness connected to a light emitting diode board with a simple structure, while also sufficiently preserving the light emitting area when light is irradiated therefrom.

According to a first aspect of the present invention, there is provided a vehicular lighting device comprising a base, an outer lens attached to a front part of the base, a board having a light emitting diode mounted thereon and which is accommodated inside an inner space formed by the base and the outer lens, and an inner lens arranged between the outer lens and the board. The inner lens comprises a lens cut region that diffuses light from the board toward the outer lens as viewed from the front, a protruding portion disposed at a position facing the light emitting diode and which projects toward the light emitting diode, and a roof extending from a base end side of the protruding portion along a transverse inward direction of the vehicle. A partial space is formed in an inner space and surrounded by the board, the protruding portion, and the roof, and a harness, which is electrically connected to the light emitting diode, is connected to the board through the partial space.

According to a second aspect of the present invention, in the lighting device according to the first aspect, the roof is formed integrally with the protruding portion, and is formed in a flat shape having a wall thickness thinner than that of the protruding portion.

According to a third aspect of the present invention, in the lighting device according to the first aspect, the base includes a hole therein that communicates from an outer surface thereof to the partial space, a retaining member that retains the harness is installed in the hole, and the roof extends to an end of the retaining member which projects into the partial space.

According to a fourth aspect of the present invention, in the lighting device according to the first aspect, at least a part of an area of connection between the board and the harness overlaps with the protruding portion as viewed from the front.

According to a fifth aspect of the present invention, in the lighting device according to the first aspect, the inner lens is mounted on the base. If an imaginary line is defined that extends in a transverse direction of the vehicle through a mounting portion of the base and the inner lens, the inner lens is arranged such that the base end side of the protruding portion is positioned nearer the outer lens in relation to the imaginary line, and an apex side of the protruding portion is positioned nearer the board in relation to the imaginary line.

According to a sixth aspect of the present invention, in the lighting device according to the fifth aspect, the base includes a flat surface that matches substantially with a direction of extension of the imaginary line, and the outer lens and the inner lens are mounted by welding on the flat surface, and wall members are erected on the flat surface between a welded part of the outer lens and a welded part of the inner lens.

According to a seventh aspect of the present invention, in the lighting device according to the sixth aspect, support members are formed on an outer peripheral surface of the base, which serve to support the base when the outer lens and the inner lens are welded thereon.

According to an eighth aspect of the present invention, in the lighting device according to the first aspect, a plurality of board welding parts, which are welded onto the base, are disposed on the board. Further, the light emitting diode comprises a plurality of light emitting diodes, the board being installed such that a predetermined distance is defined between terminals of each of the plurality of light emitting diodes and the plurality of board welding parts.

In the invention according to the first aspect, by connecting the harness, which is electrically connected to the light emitting diode, to the board through the partial space, which is surrounded by the roof and protruding portion of the inner lens having the lens cut region, for example, even though the harness is not covered by another member such as a vehicle body cover or the like, as viewed from the front, visibility of the harness from the exterior can be made difficult due to the existence of the roof. Further, because the protruding portion, which projects toward the light emitting diode, is formed more outwardly in the transverse direction of the vehicle in relation to the roof, in the event that the lighting device is viewed from a diagonally outward side in the transverse direction of the vehicle, the harness can be made even less visible due to the thickness of the protruding portion and the presence of the lens cut region. More specifically, without applying another member such as a vehicle body cover or the like, since the harness can be concealed from view by the inner lens, the outer appearance of the lighting device can be enhanced, and a sufficient light emitting area can be assured. Further, since it is possible to connect the harness to the board at a position near the light emitting diode, the board can be made small in size, and the lighting device as a whole can be reduced in scale.

In the invention according to the second aspect, by forming the roof in a flat shape and with a wall thickness that is less than that of the protruding portion, the partial space surrounded by the protruding portion, the roof, and the board can be widened, and the harness can easily be arranged or laid out therein. Further, by forming the roof and the protruding portion integrally with each other, fewer component parts are used, assembly can be facilitated, and production costs can be reduced.

In the invention according to the third aspect, by having the roof extend to an end of the retaining member which projects into the partial space, the harness, which extends from the end of the retaining member into the partial space, can be covered by the roof, and thus the harness can be made less visible.

In the invention according to the fourth aspect, by making the area of connection between the board and the harness overlap with the protruding portion as viewed from the front, the connected portion can be hidden by the protruding portion, and can thereby make the harness even less easily visible from the exterior.

In the invention according to the fifth aspect, by arranging the inner lens such that the base end side of the protruding portion is positioned nearer the outer lens in relation to the imaginary line, and such that the apex side of the protruding portion is positioned nearer the board in relation to the imaginary line, the inner lens can be disposed so as to enwrap and cover the opening of the base, whereby the harness can be more fully concealed by the roof and the protruding portion, and the harness is more difficult to be seen when the lighting device is viewed diagonally from an outer transverse side of the vehicle.

In the invention according to the sixth aspect, since the outer lens and the inner lens are welded onto the same flat surface, the outer lens and the inner lens can easily be welded without large variations in the height position of the welding surface. Further, by erecting the wall members on the flat surface between welded portions of the outer lens and the inner lens, during welding of the outer lens and the inner lens, penetration of welding debris at the mutual welded portions can be prevented.

In the invention according to the seventh aspect, by forming the support members for supporting the base, when a welding operation is carried out on the outer lens and the inner lens, such welding can be performed in a condition where the base is supported stably, for example, by a jig. Owing thereto, since shaking of the base caused by vibration welding or the like can be reduced, working efficiency can be improved when assembling the winker lamp.

In the invention according to the eighth aspect, by welding the board and the base, only a few number of screws are required for fixing the board, and therefore, the number of component parts can be reduced. Further, since it is unnecessary to provide multiple screw holes in the base, the base can be made smaller in size. Furthermore, as a result of the board being installed such that a predetermined distance is defined between terminals of each of the plurality of light emitting diodes and the plurality of board welding parts, welding debris does not become adhered to the terminals of the light emitting diodes due to welding of the board and the base.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF DRAWINGS

FIG. 4 is a table showing turned-on and turned-off states of an ON-indicator and an OFF-indicator of a TCS (Traction Control System) shown in FIG. 3;

DESCRIPTION OF EMBODIMENTS

A vehicular lighting control device according to a preferred embodiment of the present invention will be described in detail below with reference to the accompanying drawings.

Figure 1:
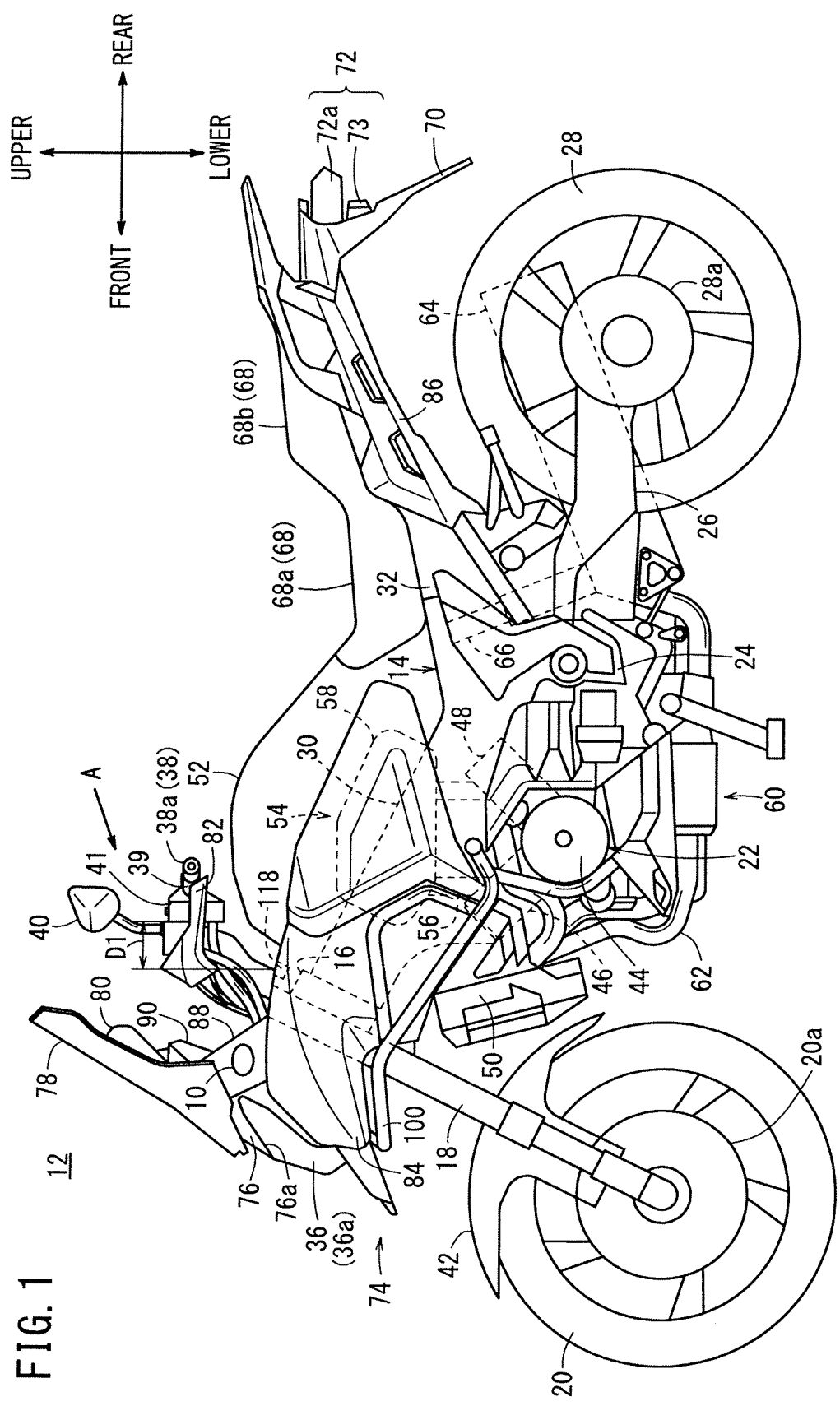
FIG. 1 is a schematic side elevational view of a saddle-type motorcycle incorporating a vehicular lighting device according to an embodiment of the present invention.

FIG. 1 is a schematic side elevational view of a saddle-type motorcycle (hereinafter also referred to as a "motorcycle") 12, which incorporates therein a vehicular lighting control device (winker lamp) 10 according to an embodiment of the present invention. The present invention will hereinafter be described in detail below as applied to a saddle-type motorcycle. However, the principles of the present invention are not limited to a saddle-type motorcycle, but also are applicable to any of various other land vehicles, including other types of powered two-wheeled vehicles, motor-assisted bicycles, and powered four-wheeled vehicles. For easier understanding of the present invention, forward, rearward, upward, and downward directions will be described with respect to the directions indicated by the arrows in FIG. 1. Leftward and rightward directions (see the leftward and rightward directions indicated by the arrows in FIG. 2) will be described with respect to directions as viewed by the rider seated on the saddle-type motorcycle 12.

As shown in FIG. 1, the motorcycle 12 includes a vehicle frame 14 as a vehicle body, a pair of left and right front fork members 18 rotatably supported by a head pipe 16 on the front end of the vehicle frame 14, a front wheel (steerable wheel) 20 mounted on the front fork members 18, an engine 22 supported on the vehicle frame 14, which serves as a drive source for the motorcycle 12, a swing arm 26 swingably supported on a lower pivot 24 of the vehicle frame 14, and a rear wheel (drive wheel) 28 mounted on the rear end of the swing arm 26.

The vehicle frame 14 comprises a highly rigid tube frame, which is cast of aluminum. The vehicle frame 14 includes a pair of left and right main frames 30 that branch leftward and rightward from the head pipe 16, and which extend obliquely rearward and downward therefrom, the pivot 24 joined to rear portions of the main frames 30 and extending downwardly therefrom, and a pair of left and right seat frames 32 mounted on a rear portion of the main frames 30 and extending obliquely rearward and upwardly therefrom. The vehicle frame 14 comprises a structure constructed from a reduced number of frame components and which is capable of supporting mechanisms within the vehicle body.

The front fork members 18 extend substantially vertically on a front portion of the vehicle body. A top bridge 34 (see FIG. 3) is mounted on upper portions of the front fork members 18. A headlight 36 for illuminating an area in front of the vehicle body is disposed on upper portions of the front fork members 18. A handle assembly 38 for steering the front wheel 20 is mounted on the top bridge 34. The handle assembly 38 includes a pair of left and right handlebars 39 that extend outward symmetrically to the left and right transversely to the vehicle body, and grips 38a mounted respectively on left and right ends of the handlebars 39. A pair of left and right rearview mirrors 40 are mounted on respective portions of the handlebars 39.

The front wheel 20 is rotatably supported on lower ends of the front fork members 18. A brake device 20a in the form of a disk brake is mounted on one side of the front wheel 20. The front wheel 20 has an upper portion covered with a front fender 42, which is attached to lower portions of the front fork members 18 above the front wheel 20.

The engine 22 comprises a water-cooled, four-stroke V-shaped four-cylinder engine. The engine 22 includes a crankcase 44 disposed on a lower portion thereof, a front cylinder 46 extending obliquely forward and upwardly from the crankcase 44, and a rear cylinder 48 extending in a rearward direction obliquely from the crankcase 44 behind the front cylinder 46. The engine 22 has an intermediate portion disposed between the front cylinder 46 and the rear cylinder 48, which is fixed to and supported by the main frames 30, and a portion disposed behind the rear cylinder 48, which is fixed to and supported by the pivot 24, so that the engine 22 is disposed in a fixed posture with respect to the main frames 30.

Each of the front cylinder 46 and the rear cylinder 48 houses therein an ignition plug for igniting an air-fuel mixture therein, and a piston for compressing the air-fuel mixture, neither of which is shown. A crankshaft and an engine output shaft (not shown), which are operatively connected to the pistons by connecting rods, are rotatably supported in the crankcase 44. The engine 22 is combined with a dual clutch transmission, which includes two clutches that can be switched into operation for allowing the motorcycle 12 to travel selectively in two travel modes, e.g., an automatic mode and a manual mode. When the engine 22 is in operation, rotational drive power is produced, which is transmitted by a drive shaft (not shown) extending rearwardly from the crankcase 44 to the rear wheel 28.

A radiator 50 for radiating heat from the engine 22 is disposed in front of the front cylinder 46. A fuel tank 52 and an intake unit 54 are disposed above the engine 22. The intake unit 54 includes a throttle body 56 connected to respective inner upper portions of the front cylinder 46 and the rear cylinder 48, and an air cleaner 58 connected to an upstream end of the throttle body 56 by a non-illustrated intake pipe.

The throttle body 56 incorporates a TBW (Throttle By Wire) system for changing the opening of a throttle valve disposed therein via an actuator. The intake unit 54 introduces air through the air cleaner 58, which removes dust and dirt and injects cleaned air together with fuel from the throttle body 56 into the front cylinder 46 and the rear cylinder 48.

The engine 22 is disposed above an exhaust assembly 60. The exhaust assembly 60 includes exhaust tubes 62 extending below the crankcase 44 and connected respectively to a front portion of the front cylinder 46 and a rear portion of the rear cylinder 48, and an exhaust muffler 64 connected to the exhaust tubes 62 and disposed on the right-hand side of the rear wheel 28. The exhaust assembly 60 serves to discharge exhaust gases from the engine 22 through the exhaust tubes 62 and the exhaust muffler 64.

The swing arm 26 extends substantially horizontally rearward from the pivot 24, and the rear wheel 28 is rotatably supported on the rear end of the swing arm 26. A brake device 28a in the form of a disk brake is mounted on one side of the rear wheel 28. A rear cushion 66, which resiliently connects the main frames 30 and the swing arm 26 to each other, is disposed upwardly of a front portion of the swing arm 26. The rear cushion 66 serves to absorb vibrations generated when the motorcycle 12 travels.

A seat 68 for passengers (a rider and a pillion passenger) to be seated thereon is disposed on the seat frames 32. The seat 68 is of a tandem structure including a front seat 68a for the rider to sit on, and a rear seat 68b for the pillion passenger to sit on behind the front seat 68a. A rear fender 70 is attached to rear portions of the seat frames 32. The rear fender 70 extends horizontally rearward from the seat frames 32 and includes a rear portion extending obliquely downward. The rear fender 70 supports thereon a tail lamp unit 72 as an illuminating unit on a rear portion of the vehicle body. The tail lamp unit 72 includes a brake lamp 72a and a pair of left and right rear winker lamps 73. The tail lamp unit 72 energizes and de-energizes the brake lamp 72a and the rear winker lamps 73 based on actions made by the rider.

The motorcycle 12 includes a vehicle body cover 74 providing a design surface (appearance) of the vehicle body along the longitudinal direction thereof. The vehicle body cover 74 is made of a polymeric material such as acrylonitrile butadiene styrene (ABS), fiber-reinforced plastics (FRP), polypropylene (PP), or the like.

The vehicle body cover 74 includes a headlight cover 76 covering the peripheral surface of the headlight 36, a screen support cover 80 supporting a screen 78 above the headlight 36, handle covers 82 covering front portions of the handle assembly 38, a pair of left and right side cowls 84 extending rearwardly from respective opposite sides of the headlight 36, and a rear cowl 86 extending obliquely rearward and upwardly along the seat frames 32 to cover opposite side surfaces of the seat frames 32.

The vehicle body cover 74 also includes a cowl support stay 88 supporting the headlight 36 and the screen support cover 80. The cowl support stay 88 is fixed to front portions of the main frames 30. The cowl support stay 88 supports thereon a meter unit 90, which is disposed behind the headlight 36, and also supports a pair of left and right front winker lamps 10 on respective opposite side surfaces thereof.

Figure 2:
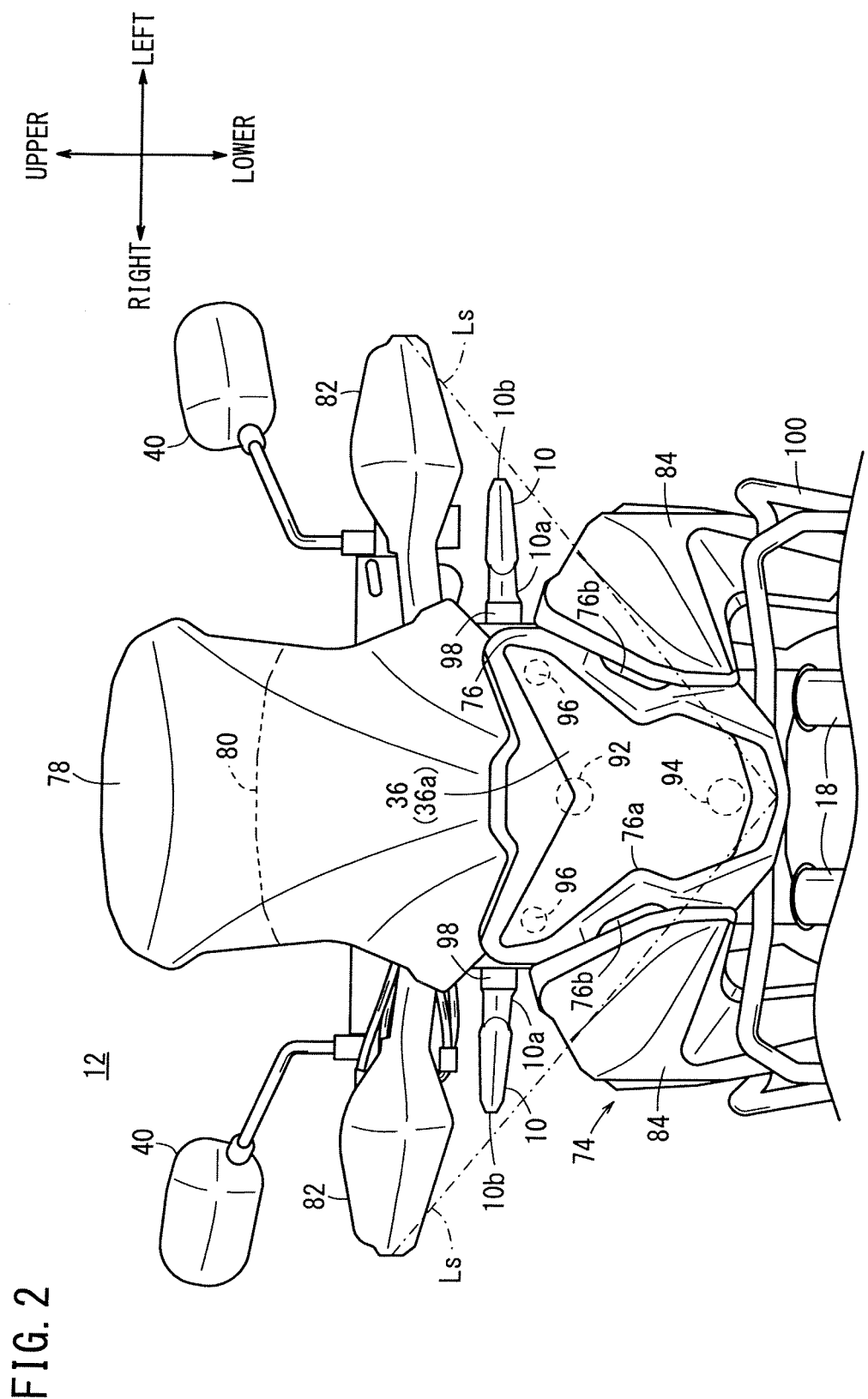
FIG. 2 is an enlarged fragmentary front elevational view of a front upper portion of the motorcycle shown in FIG. 1.

FIG. 2 is an enlarged fragmentary front elevational view of a front upper portion of the motorcycle 12 shown in FIG. 1. As shown in FIG. 2, the headlight cover 76 and the screen 78 (screen support cover 80) provide a design surface of a front upper portion of the vehicle body. The design surface is of a streamlined shape gradually inclined rearwardly from a front central portion in the transverse direction and in the upward direction.

The headlight cover 76 has opposite side surfaces covered with the side cowls 84, providing a substantially triangular design surface, which has vertices defined at upper left and right ends and at a lower central end as viewed in front elevation. The headlight cover 76 has an opening 76a defined therein, which is shaped to allow a lens surface 36a of the headlight 36 to be seen as a substantially heart shape. The headlight cover 76 also has recesses 76b defined respectively in left and right surfaces thereof. The recesses 76b and confronting edges of the side cowls 84, which extend therealong, jointly define apertures that open into the vehicle body cover 74. The apertures serve to guide ram air toward the air cleaner 58 when the motorcycle 12 is driven.

The headlight 36 is housed in the headlight cover 76 with the lens surface 36a exposed in a forward direction. The headlight 36 includes a low-beam bulb 92 disposed in a central upper position thereof, and a high-beam bulb 94 disposed in a central lower position thereof. The headlight 36 also includes a pair of left and right positioning light bulbs 96 disposed in respective transverse outer positions.

The front winker lamps 10 have respective proximal ends 10a mounted on the cowl support stay 88 (see FIG. 1) by attachments 98, and which extend substantially horizontally outward along the transverse direction of the vehicle body. The front winker lamps 10 have respective transverse outer ends 10b that project outwardly, but terminate short of line segments Ls, which extend between the lower end of the opening 76a of the headlight cover 76 and the transverse outer ends of the handle covers 82. When the upper portion of the vehicle body is viewed in front elevation, the handle covers 82, the front winker lamps 10, and the headlight cover 76 jointly define a design surface, which spreads transversely outward for better appearance in a well balanced fashion along an upward direction from the central area of a front portion of the headlight cover 76.

Furthermore, when the upper portion of the vehicle body is viewed in front elevation, the winker lamps 10 are spaced obliquely laterally from the positioning light bulbs 96 of the headlight 36. The winker lamps 10 blink to produce direction indicating signals while the motorcycle 12 is being driven. In addition, at the same time that the positioning light bulbs 96 are energized, the winker lamps 10 are energized to emit a smaller amount of light than when the winker lamps 10 blink to produce the direction indicating signals. Accordingly, the winker lamps 10 also serve as positioning lights, i.e., auxiliary lights. More specifically, a total of four lights, i.e., the two left and right positioning light bulbs 96 and the two left and right winker lamps 10, are simultaneously energized to make the motorcycle 12 highly visible to oncoming vehicles.

As shown in FIGS. 1 and 2, the vehicle body cover 74 includes cowl guard pipes 100 extending from respective left and right main frames 30 forwardly along the side cowls 84, and which are connected to a lower portion of the headlight cover 76. The cowl guard pipes 100 provide a design surface on the front portion of the vehicle body, and also serve to prevent the vehicle body cover 74 from being damaged when the motorcycle 12 overturns.

Figure 3:
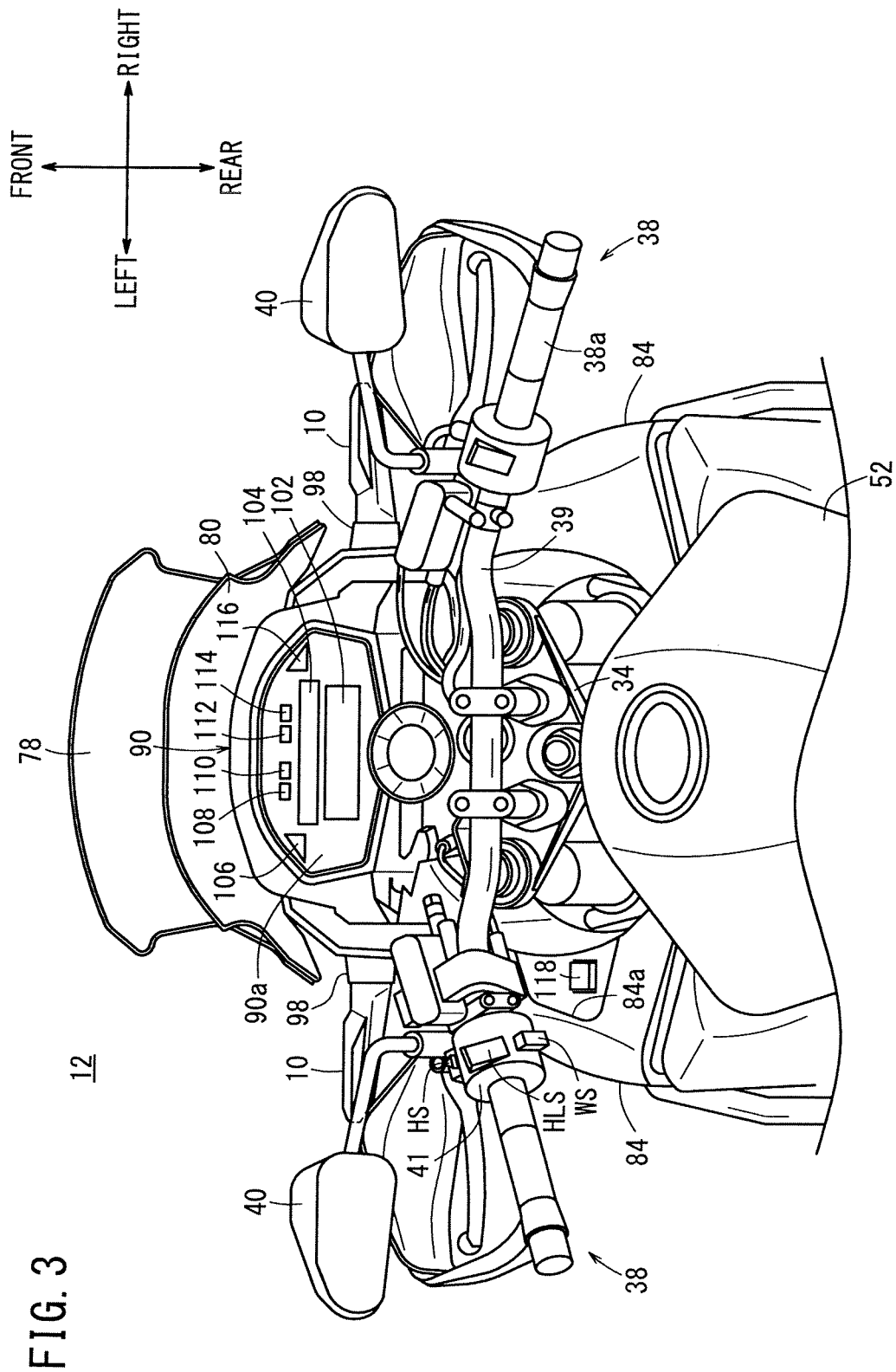
FIG. 3 is a view of a portion of the motorcycle shown in FIG. 1, as viewed in a direction indicated by the arrow A in FIG. 1.

FIG. 3 is a view of a portion of the motorcycle 12 shown in FIG. 1, as viewed in the direction indicated by the arrow A in FIG. 1. As shown in FIG. 3, a handle switch case 41 of a switch unit 208 (see FIG. 12) is mounted on the left handlebar 39 of the motorcycle 12. The handle switch case 41 supports on a surface thereof a hazard switch HS for controlling hazard blinking (hazard mode), a headlight beam switch HLS for switching between high beam and low beam modes emitted from the headlight 36, and a winker switch WS for controlling winker blinking (winker mode), arranged successively in this order along the rearward direction. Since the hazard switch HS, the headlight beam switch HLS, and the winker switch WS are positioned proximate to the handle assembly 38, the rider can easily turn on and off such switches while manipulating the handle assembly 38.

According to the present embodiment, the meter unit 90 of the motorcycle 12 displays digital representations of the speed of the motorcycle 12 and the rotational speed of the engine 22 while the motorcycle 12 is being driven. The meter unit 90 is supported on the cowl support stay 88 behind the headlight 36 (see FIG. 1).

The meter unit 90 includes a speedometer liquid crystal screen 102 for displaying the speed of the motorcycle 12, and a tachometer liquid crystal screen 104 for displaying the rotational speed of the engine 22. The speedometer liquid crystal screen 102 and the tachometer liquid crystal screen 104 are disposed on a surface of the meter unit 90, which is positioned forwardly of the handle assembly 38 and faces toward the rider sitting on the seat 68. The meter unit 90 also includes a plurality of indicators or display lamps disposed in an upper area of the surface thereof for indicating various states of a driving system and an electrical system of the motorcycle 12. More specifically, such indicators include a left winker indicator 106, a high beam indicator 108, a neutral indicator 110, an ON-indicator 112 and an OFF-indicator 114 of a TCS (Traction Control System), and a right winker indicator 116, arranged successively in this order from left to right as viewed by the rider. The left winker indicator 106 and the right winker indicator 116 are turned on when the front winker lamps 10 and the rear winker lamps 73 blink to indicate directions in which the motorcycle 12 is turned. The high beam indicator 108 is turned on when the high-beam bulb 94 of the headlight 36 is turned on to emit high-beam light. The neutral indicator 110 is turned on when the clutch of the motorcycle 12 is in a neutral position. The ON-indicator 112 and the OFF-indicator 114 are turned on based on states of the TCS.

TCS refers to a system for calculating a slip ratio based on vehicle speed signals from the front wheel 20 and the rear wheel 28 while the motorcycle 12 is driven, and for controlling operation of the motorcycle 12 based on the calculated slip ratio. For example, if the TCS decides that the rear wheel 28 is slipping based on the calculated slip ratio, then the TCS adjusts the throttle (TH) opening with the TBW system of the throttle body 56, in order to control the rate of the air-fuel mixture that is introduced into the front and rear cylinders 46, 48 so as to achieve a preset target slip ratio. The rotational speed of the engine 22, and hence the rotational speed of the rear wheel 28, are controlled to prevent the rear wheel 28 from slipping.

The TCS can be manually switched between an ON (controlling) state and an OFF (non-controlling) state by the rider, using a selector button 118 disposed in a recess 84a defined in an upper surface of the left side cowl 84. The selector button 118 is disposed at a position, which is spaced forwardly by a certain distance D1 (see FIG. 1) from the handle switch case 41 mounted on the handle assembly 38. Since the selector button 118 is spaced from the handle assembly 38, the selector button 118 is not inadvertently touched by the rider while driving the motorcycle 12. However, the selector button 118 can be reached by the rider only when the rider intends to operate the selector button 118. The rider can switch the TCS from the ON state to the OFF state by pressing the selector button 118 continuously for a long time, and can switch the TCS from the OFF state back to the ON state by pressing the selector button 118 again continuously for a long time. The TCS may remain in the OFF state continuously until the ignition switch, i.e., the engine 22, of the motorcycle 12 has been turned off. The TCS may automatically be returned to the ON state when the ignition switch is turned on again.

FIG. 4 is a table showing turned-on and turned-off states of the ON-indicator 112 and the OFF-indicator 114 of the TCS shown in FIG. 3. The ON-indicator 112 and the OFF-indicator 114 display states of the TCS based on combinations of two states thereof, i.e., turned-on and turned-off states. When the ignition switch is initially turned on, both the ON-indicator 112 and the OFF-indicator 114 are turned on for about two seconds, in order to inform the rider that the electrical system of the motorcycle 12 is energized.

Thereafter, the motorcycle 12 checks if the TCS is operating normally according to a self-diagnosis process (initial diagnosis process) before the motorcycle 12 is driven. At this time, the OFF-indicator 114 is turned off, and only the ON-indicator 112 is turned on. When the initial diagnosis process is finished, the ON-indicator 112 is turned off automatically.

When the motorcycle 12 is driven with the TCS in the ON (controlling) state, as long as the motorcycle 12 is driven normally, i.e., as long as the TCS determines that the rear wheel 28 is not slipping, both the ON-indicator 112 and the OFF-indicator 114 are turned off.

If the TCS decides that the rear wheel 28 is slipping, then the TCS controls the TBW system of the throttle body 56 as described above. While the TCS controls the TBW system, the ON-indicator 112 is controlled to blink, in order to inform the rider that the TCS is in operation.

If the rider presses the selector button 118 continuously for a long time in order to bring the TCS into an OFF (non-controlling) state when the motorcycle 12 is driven, then the OFF-indicator 114 is continuously turned on, in order to inform the rider that the TCS is not in operation.

If the TCS detects a failure (erroneous operation) according to a self-diagnosis process, then the ON-indicator 112 is turned on in order to inform the rider that the TCS is not working normally.

As described above, the motorcycle 12 lets the rider know the states of the TCS based on combinations of turned-on and turned-off states of the ON-indicator 112 and the OFF-indicator 114.

Structural details of the front winker lamps 10 will be described below with reference to FIGS. 5 through 11. Since the left and right front winker lamps 10 are symmetrical in structure, only the right winker lamp 10 as viewed from the position of the rider will be described in detail below, and detailed description of the left winker lamp 10 is omitted.

Figure 5:
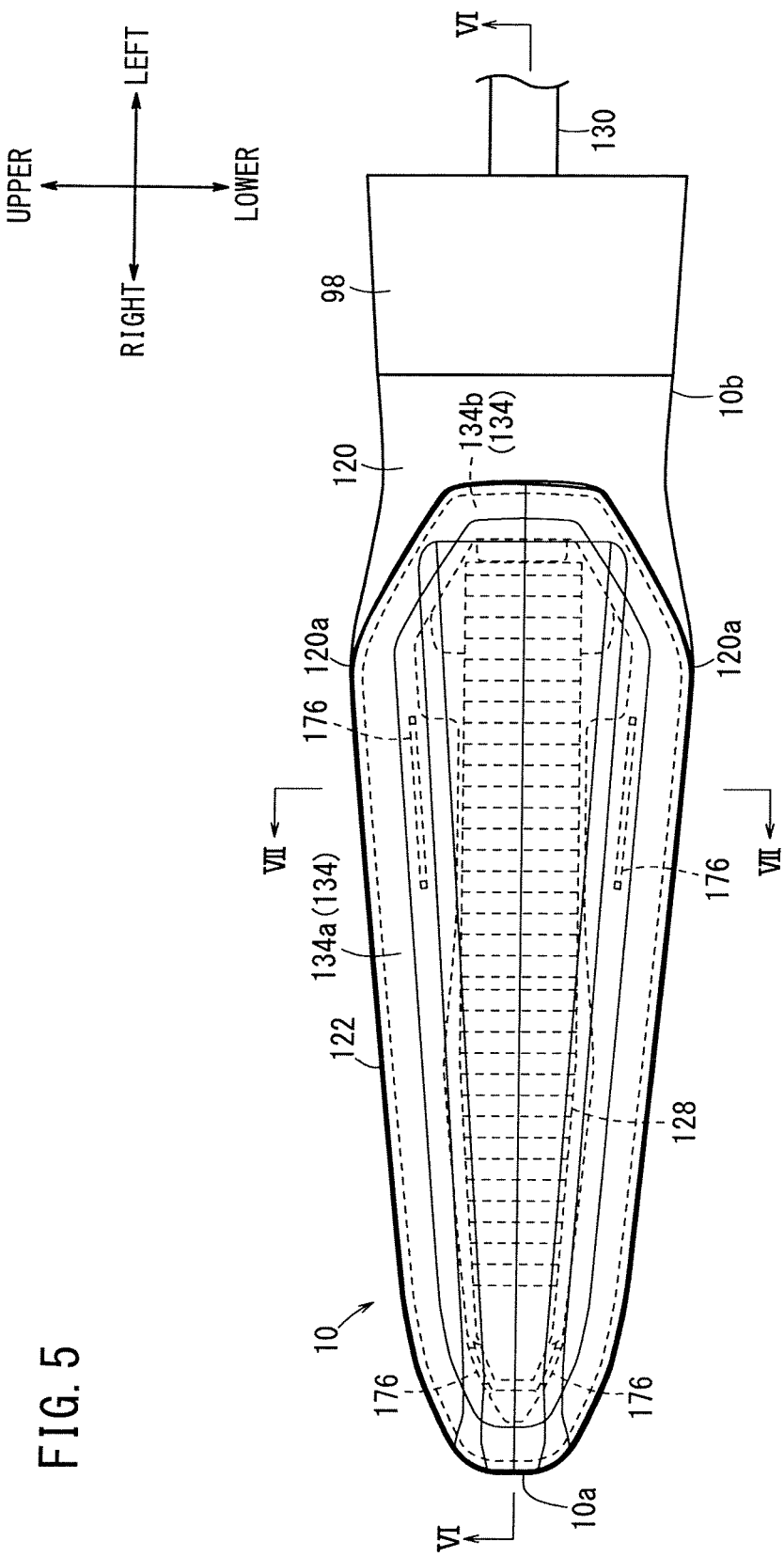
FIG. 5 is an enlarged front elevational view of a winker lamp shown in FIG. 2.
Figure 6:
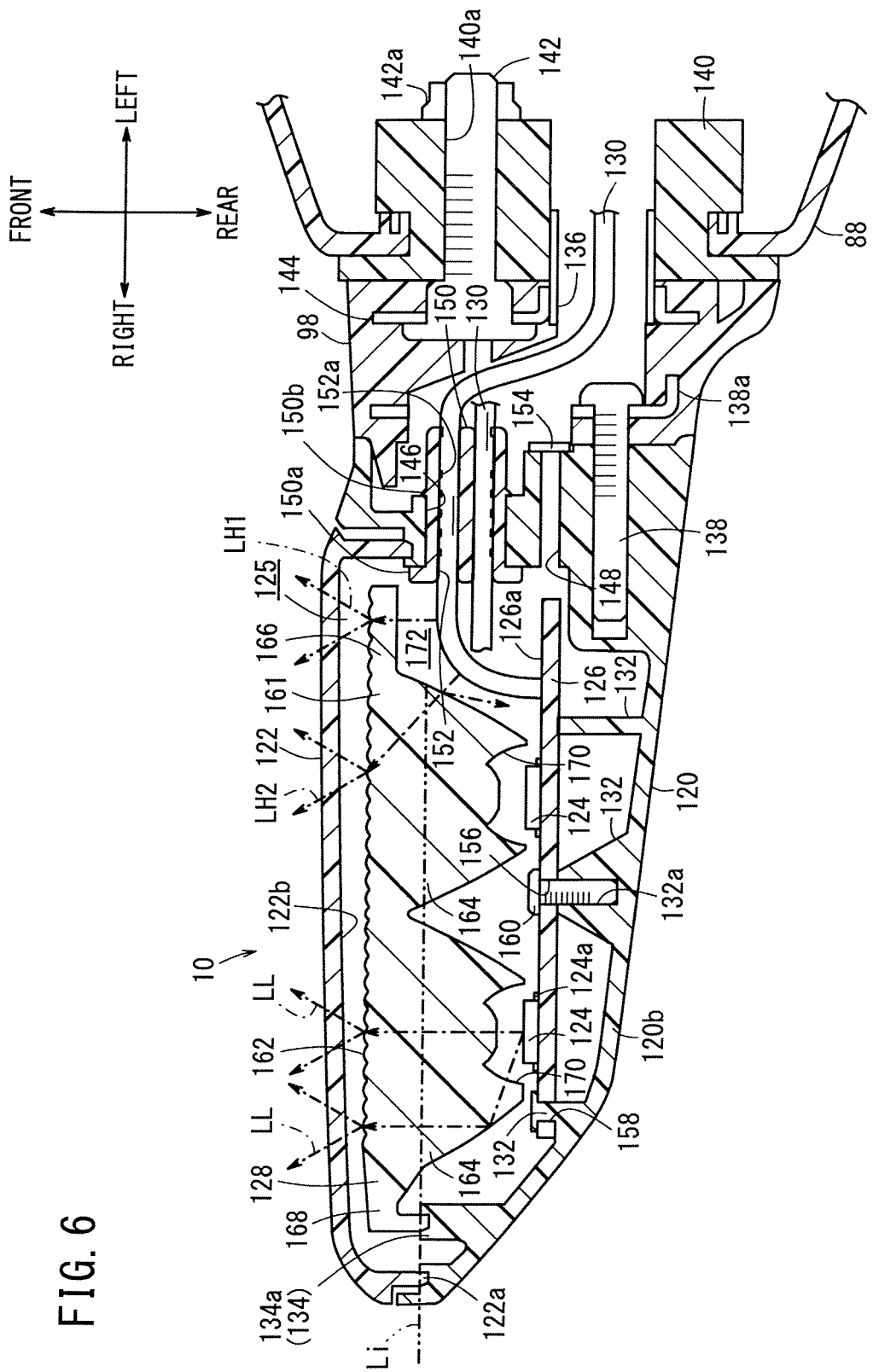
FIG. 6 is a cross-sectional view taken along line VI-VI of FIG. 5.
Figure 7:
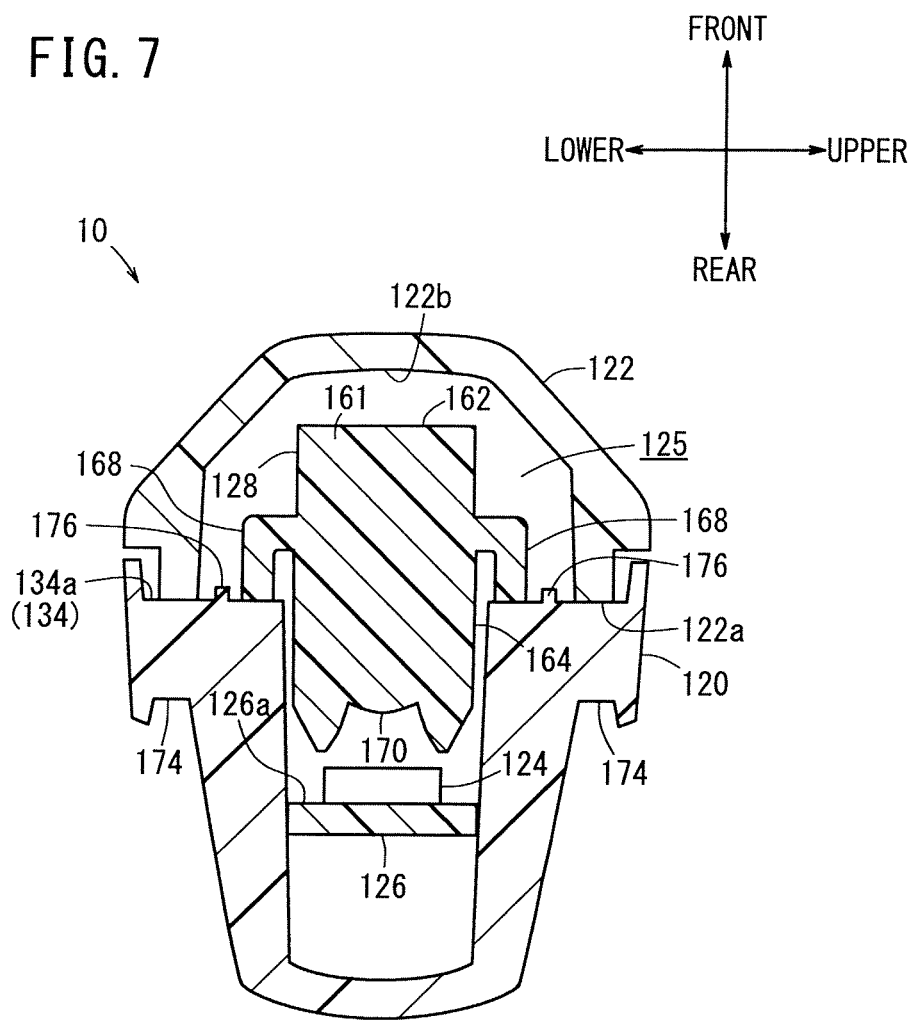
FIG. 7 is a cross-sectional view taken along line VII-VII of FIG. 5.
Figure 8:
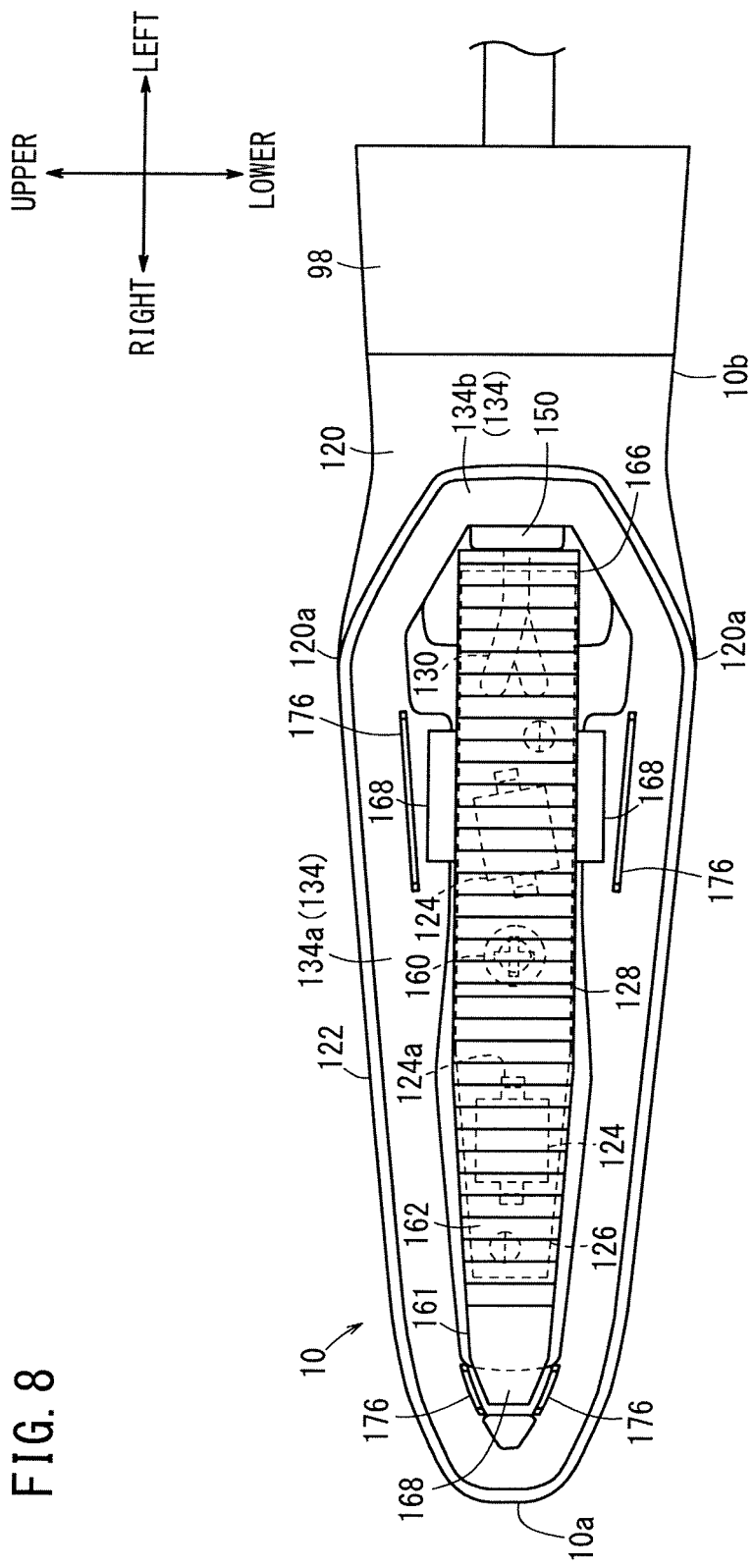
FIG. 8 is a front elevational view showing a state in which an outer lens of the winker lamp of FIG. 5 is detached therefrom.
Figure 9:
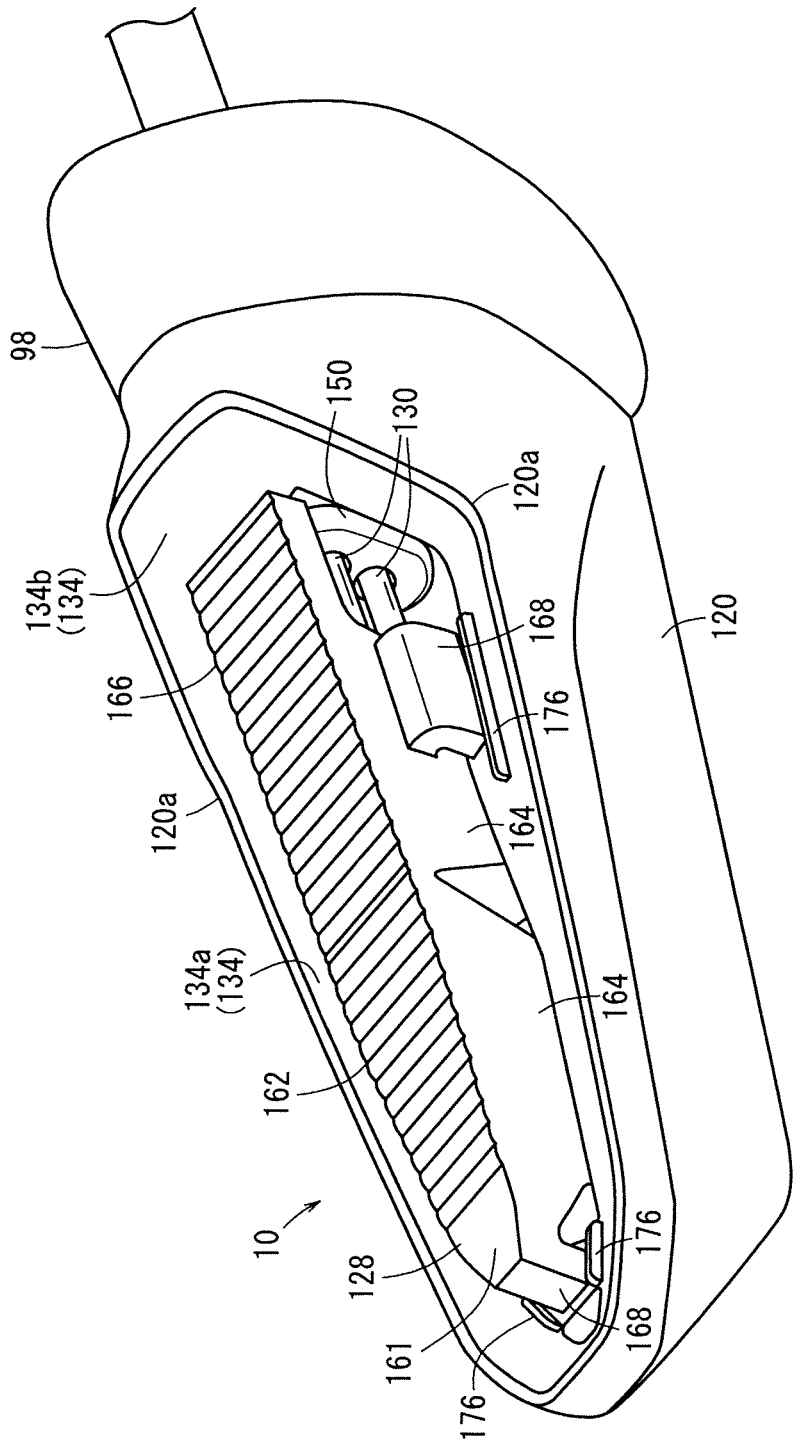
FIG. 9 is a perspective view showing the winker lamp of FIG. 8.
Figure 10:
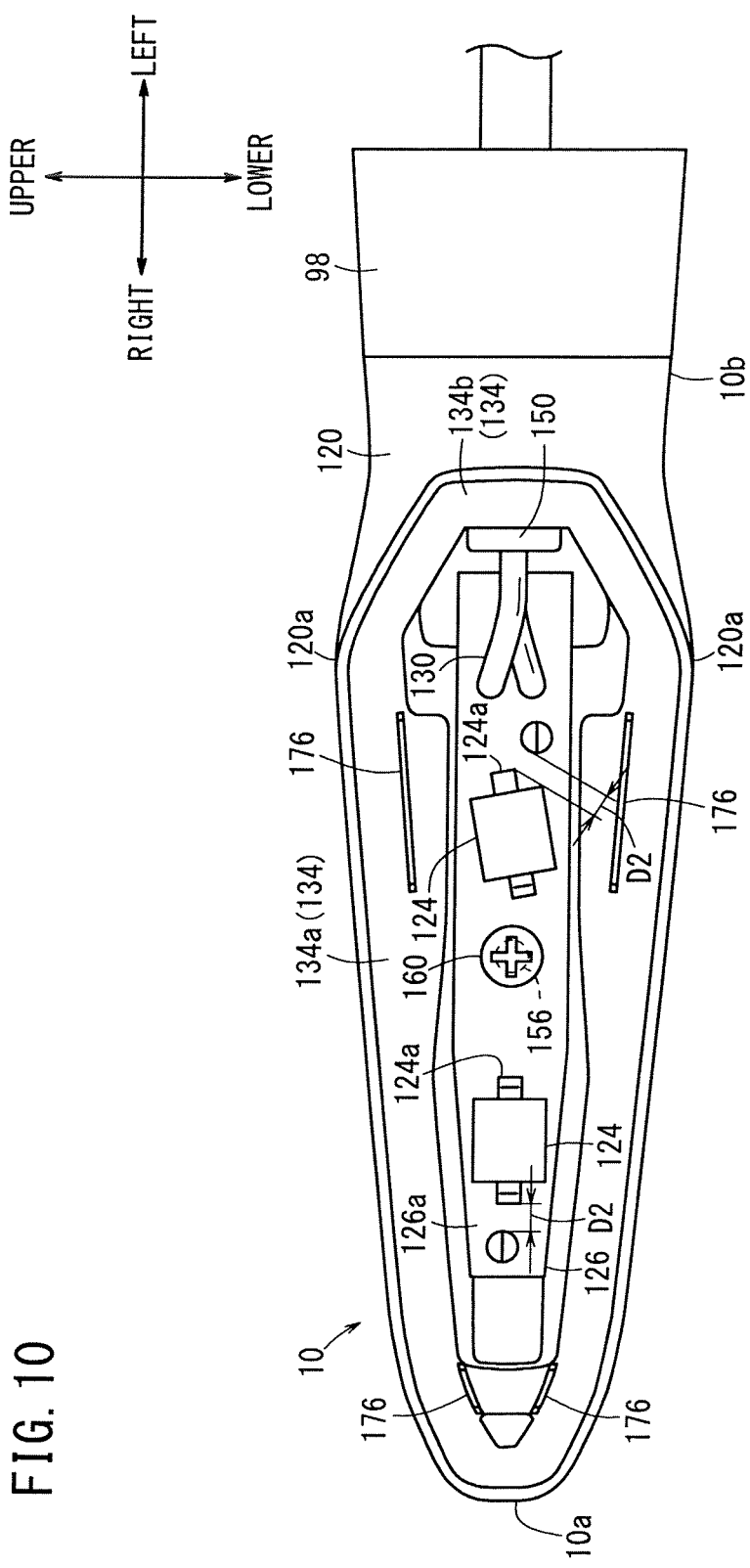
FIG. 10 is a front elevational view showing a state in which an inner lens of the winker lamp of FIG. 8 is detached therefrom.
Figure 11:
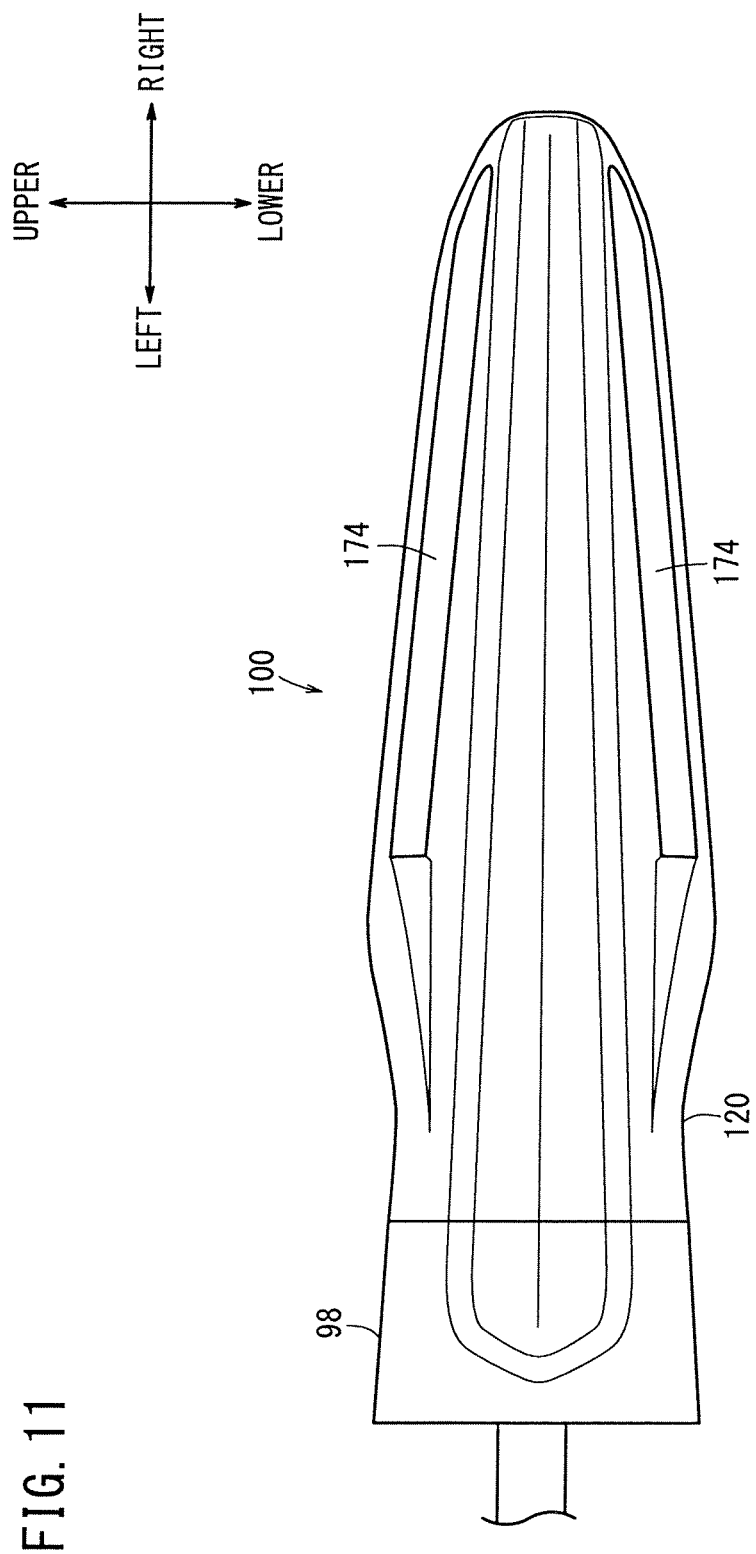
FIG. 11 is a rear view of the winker lamp of FIG. 5.

FIG. 5 is an enlarged front elevational view of the winker lamp 1C shown in FIG. 2. FIG. 6 is a cross-sectional view taken along line VI-VI of FIG. 5, and FIG. 7 is a cross-sectional view taken along line VII-VII of FIG. 5. FIG. 8 is a front elevational view showing a state in which an outer lens of the winker lamp 10 of FIG. 5 is detached therefrom, FIG. 9 is a perspective view showing the winker lamp 10 of FIG. 8, FIG. 10 is a front elevational view showing a state in which an inner lens of the winker lamp 10 of FIG. 8 is detached therefrom, and FIG. 11 is a rear view of the winker lamp 10 of FIG. 5.

As shown in FIG. 6, the winker lamp 10 according to the present embodiment includes a base 120, an outer lens 122 mounted on a front side of the base 120, a board 126 with a plurality of light-emitting diodes (LEDs) 124 mounted thereon and housed in an inner space 125 defined between the base 120 and the outer lens 122, and an inner lens 128 disposed between the outer lens 122 and the board 126. The winker lamp 1C also includes a harness 130, which is connected to a mounting surface 126a of the board 126 with the LEDs 124 mounted thereon. The harness 130 includes wires electrically connected to the LEDs 124.

As shown in FIG. 5, the base 120 has a proximal end, which is mounted on the attachment 98. The base 120 has an outer profile, which grows gradually wider vertically in a direction away from the proximal end toward a widest portion 120a near the proximal end, and then becomes gradually narrower from the widest portion 120a toward a vertically central point. As shown in FIGS. 6 and 7, the base 120 has a substantially concave or cup-like cross-sectional shape with the board 126 housed therein.

As shown in FIG. 6, the base 120 has a plurality (three in FIG. 6) of protrusive rests 132 projecting forwardly from a rear wall 120b, which serves as the bottom of the concave cross-sectional shape. The protrusive rests 132 support the board 126 thereon in spaced relationship to the rear wall 120b. Therefore, heat generated by the LEDs 124 when the LEDs 124 are energized to emit light is dissipated or radiated into the air surrounding the board 126.

The base 120 is molded from a synthetic resin, which is capable of withstanding the heat generated by the LEDs 124 when the LEDs 124 emit light. For example, a BMC (Bulk Molding Compound) resin may be used as the synthetic resin.

As shown in FIGS. 8 and 9, the base 120 has a front mounting surface 134 on which the outer lens 122 and the inner lens 128 are mounted. The front mounting surface 134 includes a flat area (flat surface) 134a that extends from the widest portion 120a along a transverse outward direction of the motorcycle 12, and a slanted area 134b, which is slanted obliquely from the widest portion 120a along an opposite transverse inward direction of the motorcycle 12.

As shown in FIGS. 5 and 6, the proximal end of the base 120 is fastened to the attachment 98 by a mounting screw 138. The attachment 98 has a harness channel 136 defined therein, which extends in a crank shape from the proximal end thereof in the transverse outward direction of the motorcycle 12. The harness 130 is guided from the proximal end of the attachment 98 through the harness channel 136 to the base 120.

The mounting screw 138 is placed in the harness channel 136 and is threaded into the base 120 through a washer 138a and the attachment 98 in the transverse outward direction of the motorcycle 12, thereby fastening the base 120 to the attachment 98. The attachment 98 preferably is made from an elastic synthetic resin, such as synthetic rubber or the like. Since the attachment 98 is elastic, the attachment 98 can absorb vibrations caused when the motorcycle 12 is driven, and hence the attachment 98 is capable of supporting the winker lamp 10 stably.

A mounting bolt 142 includes a head, which is embedded in the proximal end of the attachment 98, and a tip end that extends in the transverse inward direction of the motorcycle 12. The mounting bolt 142, with the flange 144 mounted thereon, is embedded in the attachment 98 when the attachment 98 is molded. Therefore, the mounting bolt 142 is securely held in the attachment 98 and is prevented from being removed therefrom. The mounting bolt 142 extends through a support 140, which is mounted on the cowl support stay 88.

The support 140 is molded from a synthetic resin and is fitted into the cowl support stay 88. The mounting bolt 142 is inserted into a bolt insertion hole 140a defined in the support 140, and is secured to the support 140 by a nut 142a, which is threaded over the tip end of the mounting bolt 142. Thus, the winker lamp 10 is supported firmly on the cowl support stay 88 by the attachment 98 and the support 140.

The base 120 has two holes, i.e., a first hole 146 and a second hole 148, defined in an end wall to which the attachment 98 is mounted. The first hole 146 and the second hole 148 communicate with the inner space 125 defined between the base 120 and the outer lens 122, or more specifically, with a partial space 172, to be described later. The first hole 146 is larger in diameter than the second hole 148. A grommet (retaining member) 150, which serves as a harness holder, is inserted into the first hole 146, and holds the harness 130 therein.

The grommet 150 has an insertion hole 152 defined therein through which the harness 130 extends. The insertion hole 152 is defined by an inner circumferential surface of the grommet 150, which has a plurality of teeth 152a held in close contact with the outer circumferential surface of the harness 130. The grommet 150 has a flange 150a on one end thereof, which is disposed in the inner space 125. The flange 150a has a diameter, which is greater than the first hole 146 in the base 120. The grommet 150 also has a ridge 150b on the outer circumferential surface of an intermediate portion thereof, which extends in a transverse inward direction of the motorcycle 12. The flange 150a and the ridge 150b engage with respective opposite open ends of the first hole 146, thereby securely retaining the grommet 150 on the base 120. The grommet 150 holds the harness 130, which is inserted therein, and prevents water from entering into the winker lamp 10 from between the harness 130 and the surface that defines the insertion hole 152, and from between the surface that defines the first hole 146 and the grommet 150.

The second hole 148 that is defined in the attachment 98 has an open end which is open into the inner space 125 at a position facing the board 126 and the LEDs 124. The second hole 148 serves to vent the inner space 125, equalizing the air pressure in the inner space 125 to the air pressure outside the winker lamp 10 when the air pressure in the inner space 125 is increased by the heat generated when the LEDs 124 emit light. The second hole 148 has an opposite open end that is open at the outer end of the base 120 and which is covered with an air-permeable sheet 154 that absorbs water. The air-permeable sheet 154 prevents water from entering into the inner space 125 through the second hole 148.

The outer lens 122 of the winker lamp 10 is made of a highly transparent synthetic resin. The outer lens 122 that is mounted on the front side of the base 120 serves as a front lens surface of the winker lamp 10. As shown in FIG. 5, the outer lens 122 has an outer profile, which is substantially in agreement with the peripheral edge of the base 120 as viewed in plan. The outer lens 122 is of a convex cross-sectional shape (see FIGS. 6 and 7) and has a rear open end 122a extending along the shape of the front mounting surface 134 of the base 120, which includes the flat area 134a and the slanted area 134b. More specifically, the rear open end 122a of the outer lens 122 snugly engages the front mounting surface 134 of the base 120 with no gaps therebetween, so that the outer lens 122 can be welded to the base 120.

The outer lens 122 is mounted on and joined to the base 120 by a vibration welding process. In the vibration welding process, the outer lens 122 is vibrated parallel to the base 120. Since the outer lens 122 is vibration-welded to the base 120, a hermetic seal is created to prevent rainwater, dust, dirt, etc., from entering into the inner space 125.

The outer lens 122 has an inner surface, which faces toward the inner space 125. The inner surface is cut into an outer lens cut region 122b along a plurality of cut lines that extend horizontally, i.e., along the transverse direction of the motorcycle 12, for thereby vertically diffusing light that is emitted from the LEDs 124. The outer lens 122 has an outer surface, which is not cut, but which is finished to a smooth surface to prevent mud, dirt, etc., from adhering thereto.

As shown in FIG. 10, the board 126, which is mounted on the base 120, is in the form of an elongate plate extending along the transverse direction of the motorcycle 12, with two LEDs 124 mounted on the mounting surface 126a thereof. The LEDs 124 are electrically connected by a reflow soldering process to an electrically conductive pattern that is printed on the mounting surface 126a.

According to the present embodiment, the board 126 is of a laminated structure having an alternate assembly of layers, which include board members made of, e.g., glass epoxy or phenolic paper, and copper foil, not shown. The board 126 has tubular through holes (not shown) defined therein at positions near the LEDs, and through which the electrically conductive pattern on the mounting surface 126a is electrically connected to an electrically conductive pattern on the reverse side of the board 126. The laminated structure and the through holes of the board 126 are effective to conduct heat generated on the mounting surface 126a at a time when the LEDs 124 emit light to the lower layers of the board 126 and into the space below the board 126. Since the generated heat is dissipated from the board 126, such heat is prevented from being concentrated on and around the LEDs 124. Therefore, the winker lamp 10 exhibits an increased heat radiating capability.

The board 126 has a screw insertion hole 156 defined centrally therein, and protrusive rest insertion holes (board welding parts) 158 defined therein at transverse outer ends thereof, and joints between the LEDs 124 and the harness 130. A fixing screw 160 is inserted through the screw insertion hole 156 and is threaded into an internally threaded screw hole 132a defined in the central protrusive rest 132, which projects from the rear wall 120b of the base 120. The left and right protrusive rests 132 also project from the rear wall 120b of the base 120 and have respective ends inserted into the protrusive rest insertion holes 158, and which are crimped by high-frequency induction heating into welded engagement with the peripheral edges of the protrusive rest insertion holes 158. Since the left and right protrusive rests 132 are securely joined to the board 126 around the protrusive rest insertion holes 158, the number of screws used for fastening the board 126 to the base 120 is reduced, and hence the total number of parts is reduced.

The harness 130, which is electrically connected to the LEDs 124 by the electrically conductive pattern, is connected to the mounting surface 126a of the board 126. The harness 130 has a proximal end thereof electrically connected to the electrical system of the motorcycle 12, and functions to supply electric power to the LEDs 124. A sheath of the harness 130 is preferably, but not necessarily, made of an insulative and flexible synthetic resin, which is resistant to heat generated when the LEDs 124 emit light.

The two LEDs 124 that are mounted on the board 126 comprise LEDs for emitting an amount of light at a color temperature suitable for use as the light source of the winker lamps 10. In particular, since the winker lamps 10 are aimed in a direction in which the motorcycle 12 is to be turned, the winker lamps 10 should preferably comprise devices for emitting high-intensity light with a wide directivity angle, so that light emitted from the winker lamps 10 can be diffused within a wide illumination range.

As shown in FIG. 6, the inner lens 128, which is disposed in the inner space 125, includes a lens cut region 162 on the front surface of a base portion 161, which extends along the transverse direction of the motorcycle 12, a pair of protruding portions 164 disposed at positions facing the respective LEDs 124 and which project toward the respective LEDs 124, and a roof 166 extending from the base portion 161 near one of the protruding portions 164, along the transverse inward direction of the motorcycle 12.

As shown in FIGS. 7 through 9, the base portion 161 of the inner lens 128 includes a welding arm 168 on a distal end thereof, i.e., on a transverse outer end thereof, and welding arms 168 on respective upper and lower portions of a proximal end thereof, i.e., on a transverse inner end thereof. The welding arms 168 are joined to the front mounting surface 134 of the base 120 by a vibration welding process. Therefore, the inner lens 128 is supported on the base 120 and is disposed at a given position in the inner space 125.

The lens cut region 162 has a plurality of vertical cut lines spaced along the transverse direction of the motorcycle 12. As shown in FIGS. 6 and 9, the lens cut region 162 has a plurality of arcuate convex lens surfaces disposed between the cut lines. The arcuate convex lens surfaces serve to laterally diffuse light emitted from the LEDs 124 and that is transmitted through the inner lens 128. Therefore, the lens cut region 162 functions to disperse light that travels straight from the board 126 toward the outer lens 122, as viewed in front elevation.

The two protruding portions 164 are disposed side by side on the rear surface of the inner lens 128, in respective alignment with the two LEDs 124 mounted on the board 126. As shown in FIG. 6, the protruding portions 164 are substantially part-spindle-shaped, in that the protruding portions 164 are tapered arcuately from the base portion 161, i.e., the lens cut region 162, toward the LEDs 124. The protruding portions 164 have respective crests with cavities 170 defined therein, which are concave toward the base portion 161. The cavities 170 keep the protruding portions 164 spaced from the LEDs 124 by a certain distance, for preventing heat generated upon emission of light from the LEDs 124 from being transmitted to the inner lens 128.

The roof 166 extends from the base portion 161 near one of the protruding portions 164 along the transverse inward direction of the motorcycle 12, i.e., to the right in FIG. 6. The roof 166 is in the shape of a flat plate, which is thinner than the protruding portions 164, with the lens cut region 162 extending over a front surface of the roof 166. The roof 166 has a flat rear surface joined to the base portion 161 near the protruding portion 164, and extending parallel to the board 126, which is disposed behind the roof 166 in facing relation thereto.

Since the inner lens 128 is welded to the base 120 and is supported in a given position in the inner space 125, each of the winker lamps 10 has a relatively wide partial space 172 defined between the rear surface of the roof 166 and the front surface of the board 126. The partial space 172 is surrounded by the protruding portion 164, the roof 166, the board 126, and a transverse inner side wall of the base 120. The harness 130 is placed inside the partial space 172. More specifically, the harness 130 extends from the insertion hole 152 in the grommet 150, which is supported on the transverse inner side wall of the base 120, into the partial space 172 where the harness 130 is connected to the mounting surface 126a of the board 126.

The lens cut region 162 on the front surface of the roof 166 conceals from view the harness 130, which extends into the partial space 172 as viewed in plan. More specifically, although ambient light that enters the winker lamp 10 is reflected by the harness 130, the reflected light is diffused by the lens cut region 162, and therefore the harness 130 is made less visible and is concealed from view.

The roof 166 extends to such an extent that the transverse inner end thereof is substantially aligned with the flanged end of the grommet 150. Inasmuch as the roof 166 extends to the end of the grommet 150, which projects into the partial space 172, the roof 166 covers the harness 130, which extends from the end of the grommet 150 into the partial space 172, thereby making the harness 130 much less visible.

Assembly of the winker lamp 10 according to the present embodiment is performed by welding in succession each of the members (i.e., the board 126, the inner lens 128, the outer lens 122) onto the base 120. As shown in FIG. 11, on the rear surface (back surface) of the base 120, a pair of grooves (support members) 174 are formed. The pair of grooves 174 are engraved vertically on the base 120 in the transverse direction of the vehicle and are formed in flat shapes on the bottom thereof (see FIG. 7). Upon assembly of the winker lamp 10, a fixing jig (not shown) for fixing the base 120 is placed in abutment against the pair of grooves 174. More specifically, by supporting through abutment the jig and bottoms of the grooves 174, which extend in the axial direction, welding can be carried out while the base 120 is stably supported by the jig. Owing thereto, since shaking of the base 120 is reduced during vibration welding or high frequency crimping of each of the members, working efficiency is improved when the winker lamp 10 is assembled.

In the case that the board 126 is assembled onto the base 120, the protrusive rest insertion holes 158 are fitted onto the protrusive rests 132 of the base 120, and further, the fixing screw 160 is threaded into the screw hole 132a via the screw insertion hole 156, whereby the board 126 is fixed (screwed) onto the base 120. Thereafter, by performing high frequency crimping of the protrusive rests 132, which are inserted through the protrusive rest insertion holes 158, the board 126 and the base 120 are fixed firmly to each other. In this manner, by partially welding the board 126 and the base 120, the screws required to screw-fasten the board 126 are few in number, and therefore, the number of component parts can be reduced. Further, because it is unnecessary to provide a plurality of screw holes 132a in the base 120, the base 120 itself can be reduced in size.

As shown in FIG. 10, two LEDs 124 are mounted on the board 126 such that intervals exist between terminals 124a of the LEDs 124 and the two protrusive rest insertion holes 158, which are separated by a predetermined distance D2. In this manner, welding debris of the protrusive rests 132 can be prevented from adhering to the terminals 124a as a result of high frequency crimping.

After the board 126 has been assembled on the base 120, the inner lens 128 is welded to the flat area 134a of the base 120. In this case, the welding arms 168, which are provided on the base portion 161 of the inner lens 128, and the front mounting surface 134 of the base 120 are fixed to each other by vibration welding. As shown in FIG. 8, on the front mounting surface 134, plural wall members 176 are erected on upper and lower sides of the welded portions where the welding arms 168 are welded onto the front mounting surface 134 of the base 120. The wall members 176 function to prevent welding debris, which occurs due to vibration welding of the inner lens 128, from being ejected onto the front mounting surface 134, and toward sides of the welded portions of the outer lens 122. Consequently, adhesion of welding debris on the front mounting surface 134, possibly leading to difficultly in welding of the outer lens 122, and impairment of the appearance of the winker lamp 10 can be suppressed.

In a state where the inner lens 128 is welded to the base 120, as shown in FIG. 6, with respect to an imaginary line Li that extends in the transverse direction of the vehicle through the welded portions of the base 120 and the inner lens 128, the base portion 161, the lens cut region 162, and the roof 166 are arranged nearer the outer lens 122 in relation to the imaginary line Li, whereas apex sides of the protruding portions 164 are arranged nearer the board 126 in relation to the imaginary line Li. More specifically, in the winker lamp 10, as viewed in the plane, the inner lens 128 (and protruding portions 164 thereof) are arranged so as to occupy large part of the inner space 125, whereby the LEDs 124 and the harness 130 can be prevented, by the inner lens 128, from being seen from vertical (lateral) directions, as well as from left and right (transverse) directions of the vehicle.

After the inner lens 128 has been assembled on the base 120, the outer lens 122 is welded at an outside position in relation to the mounting position of the inner lens 128 on the front mounting surface 134 of the base 120. During welding, as shown in FIG. 5, the outer lens 122 covers the front mounting surface 134 of the base 120, and the boundary (portion to be welded) between the rear side open end of the outer lens 122 and the peripheral edge of the front mounting surface 134 is fixed by vibration welding. In this case, because the outer lens 122 and the inner lens 128 are welded onto the same flat area 134$a$, the outer lens 122 and the inner lens 128 can easily be welded without large variations in the height position of the welding surface. Further, during welding of the outer lens 122 as well, welding debris can be prevented by the wall members 176, which are disposed on the mounting surface 134, from being directed toward welded portions of the inner lens 128.

In this manner, in the winker lamp 10, by welding the board 126, the inner lens 128, and the outer lens 122, such members can be mutually fixed and assembled together as a single unit.

Figure 12:
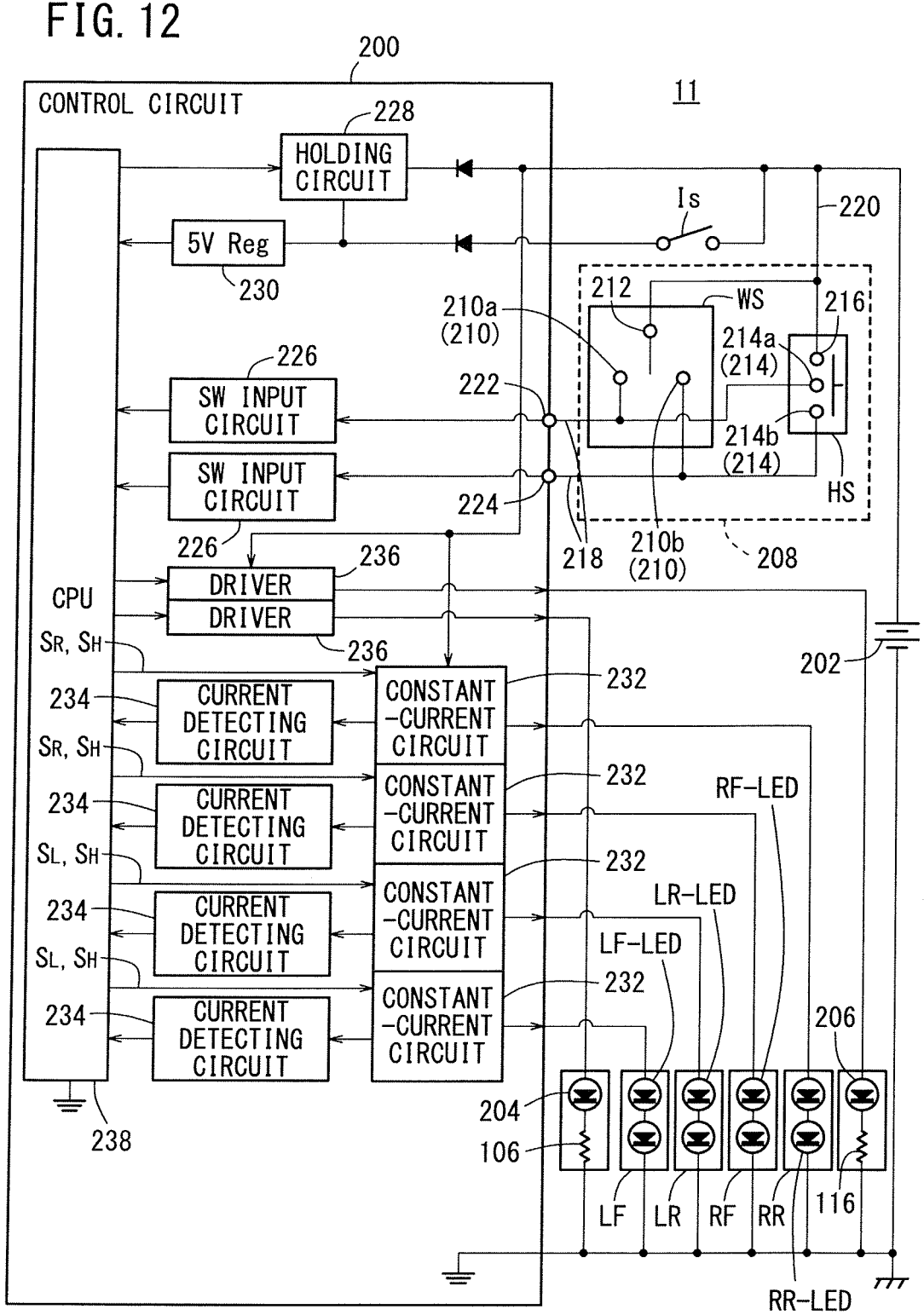
FIG. 12 is a schematic block diagram of a circuit arrangement of a winker lamp lighting control system.

Next, details of a control system (lighting control system 11) for controlling blinking of the winker lamp 10 will be described below. FIG. 12 is a schematic block diagram of a circuit arrangement of the lighting control system 11 for the winker lamp 10.

The vehicular lighting control system 11 has a total of four winker lamps, i.e., the left and right front winker lamps 10, and the left and right rear winker lamps 73. In order to distinguish the four winker lamps from each other in the circuit arrangement, in FIG. 12, the left front winker lamp is denoted by LF, the left rear winker lamp is denoted by LR, the right front winker lamp is denoted by RF, and the right rear winker lamp is denoted by RR.

The vehicular lighting control system 11 includes the winker switch WS and the hazard switch HS for blinking the winker lamps LF, LR, RF, RR, and also has a control circuit (controller) 200 for controlling blinking of the winker lamps LF, LR, RF, RR. The control circuit 200 controls the winker mode (left winker mode or right winker mode) to blink either the left winker lamps LF, LR or the right winker lamps RF, RR based on a signal from the winker switch WS, which is turned on by the rider, and also controls the hazard mode to blink both the left winker lamps LF, LR and the right winker lamps RF, RR simultaneously based on a signal from the hazard switch HS, which is turned on by the rider.

The ignition switch of the motorcycles 12 is denoted by IS. The ignition switch IS, the winker switch WS, and the hazard switch HS are connected to respective input ports of the control circuit 200. The ignition switch IS, the winker switch WS, and the hazard switch HS have respective high-side terminals connected to the positive terminal of a battery (power supply) 202. In other words, the ignition switch IS, the winker switch WS, and the hazard switch HS are connected between the control circuit 200 and the battery 202. Therefore, the control circuit 200 accurately judges whether or not the ignition switch IS and the winker switch WS are turned on by detecting an input voltage (signal) that is applied from the battery 202 when the winker switch WS and the hazard switch HS are turned on.

The control circuit 200 has output ports connected to LED arrays LF-LED, LR-LED, RF-LED, RR-LED, which serve as light sources of the winker lamps LF, LR, RF, RR, an LED 204 as a light source of the left winker indicator 106, and an LED 206 as a light source of the right winker indicator 116. The LED arrays LF-LED, LR-LED, RF-LED, RR-LED, the LED 204, and the LED 206 have cathode terminals thereof connected to ground, together with the negative terminal of the battery 202.

The ignition switch IS is a switch for starting and stopping the engine 22, which is connected by wires between the control circuit 200 and the battery 202. The ignition switch IS may comprise a key switch. When the ignition switch IS is turned on, e.g., when the key inserted therein is turned, the battery 202 is connected to the control circuit 200 for supplying electric power to the control circuit 200. More specifically, when the ignition switch IS is turned on, the battery 202 applies a voltage of 5 V, for example, to the control circuit 200.

The winker switch WS and the hazard switch HS each comprises a selector switch, which completes or breaks an electric circuit when the winker switch WS or the hazard switch HS is mechanically turned on or off by the rider. The winker switch WS and the hazard switch HS are supported on the handle switch case 41 of the switch unit 208 on the left handlebar 39 (see FIG. 3). The winker switch WS and the hazard switch HS are connected in parallel within the switch unit 208.

More specifically, the winker switch WS has two output contacts 210 (left switch contact 210$a$ and right switch contact 210$b$), which are connected to the control circuit 200, and an input contact 212, which is connected to the battery 202. The output contacts 210 and the input contact 212 are included within the switch unit 208. The left switch contact 210$a$ serves as a connection terminal for instructing the left winker lamps LF, LR to blink, whereas the right switch contact 210$b$ serves as a connection terminal for instructing the right winker lamps RF, RR to blink. When the rider tilts a trigger lever connected to the input contact 212 in one or the other direction, the input contact 212 becomes connected to the left switch contact 210$a$ or the right switch contact 210$b$, whereupon the left switch contact 210$a$ or the right switch contact 210$b$, which is connected to the input contact 212, applies the input voltage from the battery 202 to the control circuit 200.

The hazard switch HS has two output contacts 214 (left switch contact 214$a$ and right switch contact 214$b$) connected to the control circuit 200, and an input contact 216 connected to the battery 202. The output contacts 214 and the input contact 216 are included within the switch unit 208. The output contacts 214 and the input contact 216 are connected in parallel with the output contacts 210 and the input contact 212 of the winker switch WS. The hazard switch HS may comprise a three-contact switch, which mechanically connects three contacts simultaneously when a mechanical button (not shown), such as a pushbutton, is pressed by the rider. The hazard switch HS, which is constructed in the foregoing manner, is simple in structure and inexpensive to manufacture. When the rider turns on the hazard switch HS, the three contacts are connected together simultaneously, i.e., the input contact 216 is connected to both the left switch contact 214$a$ and the right switch contact 214b, which simultaneously apply the input voltage from the battery 202 to the control circuit 200.

The left switch contact 210a of the winker switch WS and the left switch contact 214a of the hazard switch HS are connected to a harness (wiring) 218, which is connected to the control circuit 200. The right switch contact 210b of the winker switch WS and the right switch contact 214b of the hazard switch HS are connected to another harness 218, which is connected to the control circuit 200. The input contact 212 of the winker switch WS and the input contact 216 of the hazard switch HS are connected to a harness (wiring) 220, which is connected to the battery 202. With the winker switch WS and the hazard switch HS being connected in parallel, the harnesses 218 are connected to the harness 220 when the winker switch WS and the hazard switch HS are turned on. In the vehicular lighting control system 11, the battery 202 can thus be connected to the control circuit 200 by the harnesses 218, 220, and the number of harnesses used is smaller than if the winker switch WS and the hazard switch HS were connected separately between the battery 202 and the control circuit 200.

The LEDs 124 of the winker lamp 10 are used as each of the LED arrays LF-LED, LR-LED, RF-LED, RR-LED, which serve as light sources of the winker lamps LF, LR, RF, RR that are connected to the output ports of the control circuit 200. In the present embodiment, each of the light sources comprises two series-connected LEDs 124. The LED arrays LF-LED, LR-LED, RF-LED, RR-LED are energized to emit light when supplied with electric current at given times from the control circuit 200. The meter unit 90 includes an instrument panel 90a (see FIG. 3), which supports thereon the LEDs 204, 206 of the left winker indicator 106 and the right winker indicator 116. The LEDs 204, 206 may be LEDs that emit a smaller amount of light than the LEDs 124.

The control circuit 200 has a left switch input port 222, a right switch input port 224, two SW input circuits (input voltage determiners) 226, a holding circuit (holder) 228, a 5V regulator 230, four constant-current circuits 232, four current detecting circuits 234, two indicator drivers 236, and a CPU (judging means) 238.

The left switch input port 222 and the right switch input port 224 function as parts of the input ports of the control circuit 200. The left switch input port 222 has a high-side terminal, which is connected to the left switch contacts 210a, 214a of the winker switch WS and the hazard switch HS, and a low-side terminal, which is connected to one of the SW input circuits 226. Therefore, the left switch input port 222 introduces an input voltage into the control circuit 200, which is delivered from the left switch contacts 210a, 214a.

The right switch input port 224 has a high-side terminal, which is connected to the right switch contacts 210b, 214b of the winker switch WS and the hazard switch HS, and a low-side terminal, which is connected to the other of the SW input circuits 226. Therefore, the right switch input port 224 introduces an input voltage into the control circuit 200, which is delivered from the right switch contacts 210b, 214b.

The SW input circuit 226 is connected between the left switch input port 222 or the right switch input port 224 and the CPU 238, and comprises a circuit arrangement for determining the voltage value of an input voltage that is delivered from the left switch input port 222 or the right switch input port 224.

The control circuit 200 normally receives an input voltage that is applied when the winker switch WS or the hazard switch HS is turned on. In addition, when a leakage current is generated in the switch unit 208, the control circuit 200 may also receive a voltage based on the leakage current. A leakage current is generated in the switch unit 208, for example, if rain water or the like enters the winker switch WS or the hazard switch HS, which is exposed to the external environment, thereby electrically connecting the input contact 212 or 216 to the output contact 210 or 214. The SW input circuit 226 functions to block a voltage that is based on such a leakage current, and to detect only an input voltage applied when the winker switch WS or the hazard switch HS is turned on, so as to output a predetermined signal (voltage value) to the CPU 238.

The holding circuit 228 has input terminals connected respectively to the CPU 238 and the battery 202, and an output terminal connected to the 5V regulator 230. The holding circuit 228 functions to maintain the CPU 238 and the battery 202 in connection with each other, based on the hazard mode of the winker lamps LF, LR, RF, RR as determined by the CPU 238. More specifically, when the winker lamps LF, LR, RF, RR operate in the hazard mode, the CPU 238 inputs an ON signal to the holding circuit 228, and the holding circuit 228 keeps the CPU 238 and the battery 202 connected to each other, as long as the ON signal is input to the holding circuit 228.

Consequently, even if the ignition switch IS is turned off, i.e., even if the engine 22 is stopped, when the winker lamps LF, LR, RF, RR are operating in the hazard mode, the holding circuit 228 enables the voltage from the battery 202 to be applied continuously to the CPU 238, in order to keep the hazard mode operational until the hazard switch HS has been turned off by the rider. The CPU 238 thus operates to keep the winker lamps LF, LR, RF, RR operating in the hazard mode, thereby making the motorcycle 12 highly visible and noticeable even when the engine 22 is at rest.

When the hazard switch HS is turned off by the rider in order to stop the winker lamps LF, LR, RF, RR from operating in the hazard mode, the holding circuit 228 disconnects the battery 202 and the CPU 238 from each other, thereby stopping supply of voltage from the battery 202 to the CPU 238. Since supply of voltage from the battery 202 to the CPU 238 remains stopped unless the ignition switch IS is turned on again, the winker lamps LF, LR, RF, RR are prevented from becoming energized (i.e., from blinking), even if the winker switch WS or the hazard switch HS is turned on after the engine 22 has been stopped. Therefore, the winker lamps LF, LR, RF, RR will not operate in the hazard mode if a third party, for example, turns on the hazard switch HS.

The 5V regulator 230 has an input terminal, which is connected to the ignition switch IS and to the output terminal of the holding circuit 228, and an output terminal, which is connected to the CPU 238. The 5V regulator 230 has a function to decrease the voltage from the battery 202 to a drive voltage of 5 V, for thereby energizing the CPU 238 and stably supplying the drive voltage of 5 V to the CPU 238.

The constant-current circuits 232 supply a prescribed amount of current to the winker lamps LF, LR, RF, RR, and are associated respectively with the winker lamps LF, LR, RF, RR. The constant-current circuits 232 have respective input terminals, which are connected to the CPU 238 and to the battery 202, and respective output terminals, which are connected to the respective current detecting circuits 234 and to the respective LED arrays LF-LED, LR-LED, RF-LED, RR-LED of the winker lamps LF, LR, RF, RR.

The constant-current circuits 232 receive winker blinking signals $S_L$, $S_R$, $S_H$ sent from the CPU 238, connect the battery 202 and the LED arrays LF-LED, LR-LED, RF-LED, RR-LED to each other, and supply prescribed currents from the battery 202 to the LED arrays LF-LED, LR-LED, RF-LED, RR-LED to enable the LED arrays LF-LED, LR-LED, RF-LED, RR-LED to emit light.

Among the winker lamps LF, LR, RF, RR, the winker lamps LF, RF also serve as positioning lights, which emit a smaller amount of light than when the winker lamps blink to produce direction indicating signals while the motorcycle 12 is being driven. The constant-current circuits 232, which are connected to the winker lamps LF, RF, include respective circuits for supplying a constant current for the positioning lights from the battery 202.

The current detecting circuits 234 have respective input terminals, which are connected to the constant-current circuits 232, and respective output terminals, which are connected to the CPU 238. The current detecting circuits 234, which are connected in this manner, supply the CPU 238 with feedback information concerning operation of the constant-current circuits 232. More specifically, in the event of a disconnection between the constant-current circuits 232 and the LED arrays LF-LED, LR-LED, RF-LED, RR-LED, no current flows from the constant-current circuits 232, even if the constant-current circuits 232 receive the blinking signals $S_L$, $S_R$, $S_H$ from the CPU 238. At this time, the current detecting circuits 234, which detect current values of the constant-current circuits 232, confirm that a disconnection has occurred between the constant-current circuits 232 and the LED arrays LF-LED, LR-LED, RF-LED, RR-LED. Since the current detecting circuits 234 are connected respectively to the constant-current circuits 232, the current detecting circuits 234 can confirm respective disconnections that may occur with respect to the constant-current circuits 232. Consequently, the control circuit 200 can detect such disconnections with increased accuracy.

The indicator drivers 236, which supply a prescribed amount of current to the LEDs 204, 206 of the left winker indicator 106 and the right winker indicator 116, are connected respectively to the LEDs 204, 206. The indicator drivers 236 have respective input terminals, which are connected to the CPU 238, and respective output terminals, which are connected to the LEDs 204, 206 of the left winker indicator 106 and the right winker indicator 116. The indicator drivers 236 receive the winker blinking signals $S_L$, $S_R$, $S_H$ from the CPU 238, and supply a prescribed current from the battery 202 to the LEDs 204, 206 so as to enable the LEDs 204, 206 to emit light.

The CPU 238 comprises a microprocessor (microcomputer) of known nature for performing processing sequences therein, the microprocessor having input and output interfaces. The CPU 238 may be combined with an ECU (Engine Control Unit), not shown, for controlling the engine 22.

The CPU 238 judges whether or not the winker switch WS and the hazard switch HS are turned on or off, and controls light emission from the LED arrays LF-LED, LR-LED, RF-LED, RR-LED of the winker lamps LF, LR, RF, RR, and the LEDs 204, 206 of the left winker indicator 106 and the right winker indicator 116, based on such a judgment. The CPU 238 stores therein a judging program, not shown, for judging whether or not the winker switch WS and the hazard switch HS are turned on or off, and performs a judging process based on such a judging program.

The CPU 238 has a register (not shown) of three or more bits for managing energization of the winker lamps LF, LR, RF, RR in each cycle of operation. The winker modes (left winker mode and right winker mode) and the hazard mode of the winker lamps LF, LR, RF, RR are controlled by the CPU 238 based on flags (left winker mode flag, right winker mode flag, and hazard mode flag), which are set in the register by the CPU 238.

For example, if the CPU 238 sets the left winker mode flag to 1 (true) in the register, then the CPU 238 outputs winker blinking signals $S_L$ to the constant-current circuits 232 for blinking the left winker lamps LF, LR, and if the CPU 238 sets the right winker mode flag to 1 in the register, then the CPU 238 outputs winker blinking signals $S_R$ to the constant-current circuits 232 for blinking the right winker lamps RF, RR. If the CPU 238 sets the hazard mode flag to 1 in the register, then the CPU 238 outputs winker blinking signals $S_H$ to the constant-current circuits 232 for blinking the winker lamps LF, LR, RF, RR.

The winker blinking signals $S_L$, $S_R$, $S_H$ are pulse signals that have a repetitive pattern of alternate high and low levels at a prescribed cyclic period. The winker blinking signals $S_L$, $S_R$, $S_H$ are sent to the constant-current circuits 232 depending on the left winker mode, the right winker mode, and the hazard mode, which are determined by the judging process. When the winker blinking signals $S_L$, $S_R$, $S_H$ are of a high level, the constant-current circuits 232 connect the battery 202 to the LED arrays LF-LED, LR-LED, RF-LED, RR-LED. The constant-current circuits 232 supply current from the battery 202 at a suitable time to desired ones of the LED arrays LF-LED, LR-LED, RF-LED, RR-LED, thereby blinking corresponding ones of the winker lamps LF, LR, RF, RR. Since the CPU 238 blinks the winker lamps LF, LR, RF, RR based on the different flags, which are set respectively for the left winker mode, the right winker mode, and the hazard mode, the timing at which the winker lamps LF, LR, RF, RR are blinked in the left winker mode, the right winker mode, and the hazard mode can be changed based on the flags, thereby enabling the winker lamps LF, LR, RF, RR to be blinked with high freedom.

The winker lamp 10 according to the embodiment of the present invention is basically constructed as described above. Next, operations of the winker lamp 10 will be described below.

According to the present embodiment, when the motorcycle 12 is being driven, the left and right winker lamps 10 are illuminated at a small light intensity as positioning lights (auxiliary lights), whereas when the rider operates the winker switch WS in the vicinity of the handle assembly 38, based on such an operation, the winker lamp 10 on one side flashes or blinks at a large light intensity. Further, when the hazard switch HS is turned ON, the left and right winker lamps 10 are configured to blink simultaneously at a large light intensity.

Accordingly, electrical power, which is controlled at a given light emission intensity and timing based on the above-described lighting operation, is supplied through the harness 130 to the LEDs 124 of the winker lamp 10 from a non-illustrated electrical system controller. As shown in FIG. 6, the LEDs 124, when supplied with a predetermined amount of electrical power, emit light LL that radiates from the front surface according to the light-emitting characteristics. Light LL emitted from the LEDs 124 penetrates into the protruding portions 164 from the cavities 170 of the inner lens 128, and is guided in a forward direction by the outer shape of the protruding portions 164. Accordingly, preferably, the protruding portions 164 have curved shapes that enable total forward reflection of light LL emitted from the LEDs 124. Owing thereto, light LL emitted from the LEDs 124 can easily be guided to the front surface of the inner lens 128. Light LL having passed through the interior of the protruding portions 164, upon reaching the lens cut region 162 on the front surface of the inner lens 128, is diffused in the widthwise direction (lateral direction) of the vehicle by the lens surface of the lens cut region 162. Thus, the inner lens 128 is capable of emitting a large number of light rays that proceed diagonally forward from the front surface of the lens cut region 162 in the widthwise (lateral) direction of the vehicle. Such light rays, which proceed diagonally forward in the lateral direction of the vehicle, enter into the outer side lens cut region 122b of the outer lens 122 and are further diffused in the vertical direction. Thus, the winker lamp 10 is capable of irradiating light of the LEDs 124 from the front surface of the outer lens 122, which is diffused in both lateral and vertical directions of the vehicle.

The harness 130 for supplying power to the LEDs 124 is connected from the grommet 150 to the board 126 through the partial space 172. The partial space 172 is formed as a comparatively wide space, by forming the roof 166 in a flat shape having a wall thickness thinner than that of the protruding portions 164, whereby the harness 130 can easily be arranged within the partial space 172.

Further, by arranging the harness 130 in the partial space 172, the harness 130 is made harder to see from outside of the winker lamp 10. More specifically, because the roof 166, which is positioned in front of the partial space 172, includes the lens cut region 162 on the front surface thereof, light LH1 that is oriented in a frontward direction from the harness 130 (e.g., external light that is reflected by the harness 130) can be diffused in the lateral direction of the vehicle. Owing thereto, even if viewed from in front of the roof 166, because the light LH1 from the harness 130 is dispersed into undeterminable rays, visibility of the harness 130 can be prevented. In addition to this, in the winker lamp 10, because light LH1 from the harness 130 also is diffused in vertical directions by the outer side lens cut region 122b of the outer lens 122, visibility of the harness 130 is prevented even further.

Further, because the protruding portions 164 are arranged diagonally across the harness 130 laterally from the front of the vehicle, the harness 130 can be made less visible, in particular, with respect to visibility thereof diagonally from the outside laterally of the vehicle, as viewed from the standpoint of an oncoming vehicle or pedestrian. More specifically, concerning light LH2 that is directed diagonally forward from the harness 130, a portion of such rays are reflected by the curved shape of the protruding portion 164, and then the rays progress within the protruding portion 164 in a state in which the light intensity therefrom is lowered. In addition, since the light LH2 that is directed diagonally forward from the harness 130 reaches the lens cut region 162 in this fashion, and then is spread out in the lateral direction of the vehicle, visibility of the harness 130 is further prevented from a diagonally forward outside lateral direction of the vehicle.

In the foregoing manner, with the winker lamp 10 according to the present embodiment, the harness 130, which extends into the interior of the partial space 172, can be made less easily visible by the inner lens 128. Owing thereto, for example, even though the harness 130 is not covered by another member such as the vehicle body cover 74 or the like, the harness 130 can be concealed from view. Consequently, upon illumination of the winker lamp 10, a sufficient light emission area of the winker lamp 10 can be assured, and as a result, a favorable lighting condition can be realized. Further, since it is possible to connect the harness 130 to the board 126 at a position near the LEDs 124, the board 126 can be made small in size, and the winker lamp 10 as a whole can be reduced in scale.

In the winker lamp 10, the area of connection between the board 126 and the harness 130 may be set to overlap with the protruding portion 164 as viewed from the front. Owing thereto, the area of connection between the board 126 and the harness 130 can be hidden, in the front view, by the protruding portion 164, thereby making the harness 130 even less easily visible from the exterior.

Further, as shown in FIG. 6, in the case that an imaginary line Li is defined, which extends in the transverse direction of the vehicle through the welded portions of the base 120 and the inner lens 128, the inner lens 128 is arranged such that base portion 161 sides of the protruding portions 164 are positioned nearer the outer lens 122 in relation to the imaginary line Li, and the apex sides of the protruding portions 164 are positioned nearer the board 126 in relation to the imaginary line Li. More specifically, the protruding portions 164 project by a large amount, so that the harness 130 is more difficult to be seen, in the case that the winker lamp 10 is viewed diagonally from an outer side in the transverse direction of the vehicle.

Furthermore, by integrally forming the roof 166 and the protruding portions 164 of the inner lens 128, it is unnecessary to prepare the roof 166 as a separate component apart from the inner lens 128, and accordingly the number of components can be reduced. Therefore, assembly of the winker lamp 10 is facilitated, and production costs for the winker lamp 10 can be reduced.

Although a certain preferred embodiment of the present invention has been shown and described in detail, it should be understood that various additional or modified structures or process steps could be adopted therein without departing from the scope of the invention as set forth in the appended claims. For example, the inner lens 128 may be constituted without providing the lens cut region 162 on the front surface thereof, as in the present embodiment, but rather by providing the lens cut region 162 on a back surface (rear surface) of the inner lens 128.

The invention claimed is:

1. A vehicular lighting device comprising:
   a base,
   an outer lens attached to a front part of the base,
   a board having a light emitting diode mounted thereon and which is accommodated inside an inner space formed by the base and the outer lens, and
   an inner lens arranged between the outer lens and the board, wherein the inner lens comprises:
      a front surface,
      a lens cut region that is disposed on the front surface facing the outer lens and diffuses light from the board toward the outer lens as viewed from the front,
      a protruding portion disposed on a surface opposite to the lens cut region and at a position facing the light emitting diode and which projects toward the light emitting diode, and
      a roof having the lens cut region on the front surface and extending from a base end side of the protruding portion along a transverse inward direction of the vehicle;
   and wherein:
   a harness, which is electrically connected to the light emitting diode, extends outwardly in the transverse direction passing behind the roof and passing a front of the board and is connected to a front surface of the board;
   the inner lens is mounted on the base;
   if an imaginary line is defined that extends in a transverse inward direction of the vehicle through a mounting portion of the base and the inner lens, the inner lens is arranged such that the base end side of the protruding portion is positioned nearer the outer lens in relation to the imaginary line, and an apex side of the protruding portion is positioned nearer the board in relation to the imaginary line;

the base includes a flat surface that matches substantially with a direction of extension of the imaginary line;

the outer lens and the inner lens are mounted by welding on the flat surface; and wall members are erected on the flat surface between a welded part of the outer lens and a welded part of the inner lens.

2. The lighting device according to claim 1, wherein the roof is formed integrally with the protruding portion, and is formed in a flat shape having a wall thickness thinner than that of the protruding portion.

3. The lighting device according to claim 1, wherein at least a part of an area of connection between the board and the harness overlaps with the protruding portion as viewed from the front.

4. The lighting device according to claim 1, wherein support members are formed on an outer peripheral surface of the base, which serve to support the base when the outer lens and the inner lens are welded thereon.

5. The lighting device according to claim 1, wherein:

a plurality of board welding parts, which are welded onto the base, are disposed on the board; and the light emitting diode comprises a plurality of light emitting diodes, the board being installed such that a predetermined distance is defined between terminals of each of the plurality of light emitting diodes and the plurality of board welding parts.

6. The lighting device according to claim 1, wherein:

a partial space is formed in the inner space and surrounded by the board, the protruding portion, and the roof;

the base has a hole formed therein that communicates from an outer surface of the base at a place where the vehicular lighting device is attached to the vehicle;

a grommet that holds the harness is inserted into the hole; and the roof extends to an end of the grommet that projects into the partial space.

* * * * *